(12) United States Patent
Walsh

(10) Patent No.: US 11,500,704 B2
(45) Date of Patent: Nov. 15, 2022

(54) SYSTEM AND METHOD FOR INTELLIGENT REAL-TIME LISTENING AND LOAD BALANCING OF INTEGRATION PROCESS EXECUTIONS

(71) Applicant: BOOMI, INC., Round Rock, TX (US)

(72) Inventor: Jason R. Walsh, Ardmore, PA (US)

(73) Assignee: Boomi, LP, Chesterbrook, PA (US)

( * ) Notice: Subject to any disclaimer, the term of this patent is extended or adjusted under 35 U.S.C. 154(b) by 92 days.

(21) Appl. No.: 16/944,610

(22) Filed: Jul. 31, 2020

(65) Prior Publication Data

US 2022/0035688 A1 Feb. 3, 2022

(51) Int. Cl.
  *G06F 3/01* (2006.01)
  *G06F 9/54* (2006.01)
  *G06Q 40/04* (2012.01)
  *G06N 3/02* (2006.01)

(52) U.S. Cl.
  CPC .............. *G06F 9/547* (2013.01); *G06N 3/02* (2013.01); *G06Q 40/04* (2013.01)

(58) Field of Classification Search
  CPC ........... G06F 9/547; G06N 3/02; G06Q 40/04
  See application file for complete search history.

(56) References Cited

U.S. PATENT DOCUMENTS

| | | | |
|---|---|---|---|
| 10,866,788 B2 * | 12/2020 | Reddy | G06F 9/541 |
| 2015/0301572 A1 * | 10/2015 | Zhou | G06F 1/3203 713/320 |
| 2016/0359680 A1 * | 12/2016 | Parandehgheibi | G06F 16/288 |
| 2017/0249689 A1 * | 8/2017 | O'Neill | G06Q 10/087 |
| 2017/0324802 A1 * | 11/2017 | Kim | H04L 41/5032 |
| 2019/0164126 A1 * | 5/2019 | Chopra | G06Q 10/0834 |
| 2019/0179664 A1 * | 6/2019 | Gujarathi | H04L 63/00 |
| 2019/0266014 A1 * | 8/2019 | Bahl | G06N 20/00 |
| 2020/0342961 A1 * | 10/2020 | Baughman | G06F 16/285 |

* cited by examiner

*Primary Examiner* — Timothy A Mudrick
*Assistant Examiner* — Abdou K Seye
(74) *Attorney, Agent, or Firm* — Prol Intellectual Property Law, PLLC; H. Kenneth Prol

(57) ABSTRACT

An information handling system operating an intelligent real time listen and load balance system comprising a processor training a triggering event correlating neural network to identify a correlation between changes made to a dataset during previous triggering events and previous executions of a triggered integration process, based on previous co-occurrences of the triggering event dataset changes and the triggered integration process executions, determining that current changes to the dataset during a current triggering event correlates to the triggered integration process, indicating new or modified data requires execution of the triggered integration process, and determining predicted triggered integration process execution metrics for a plurality of cloud computing nodes based on received performance metrics for the plurality of cloud computing nodes. The processor may also identify an optimal cloud computing node by comparing the predicted execution metrics for each of the cloud computing nodes for execution of the triggered integration process.

20 Claims, 9 Drawing Sheets

SYSTEM AND METHOD FOR INTELLIGENT REAL-TIME LISTENING AND LOAD BALANCING OF INTEGRATION PROCESS EXECUTIONS

FIELD OF THE DISCLOSURE

The present disclosure relates generally to a system and method for deploying and executing customized data integration processes. More specifically, the present disclosure relates to determination of trigger events and optimizing execution timing and execution location for an integration process.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), a head-mounted display device, server (e.g., blade server or rack server), a network storage device, a network storage device, a switch router or other network communication device, other consumer electronic devices, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components. Further, the information handling system may include telecommunication, network communication, and video communication capabilities and require communication among a variety of data formats.

BRIEF DESCRIPTION OF THE DRAWINGS

The present disclosure will now be described by way of example with reference to the following drawings in which.

The use of the same reference symbols in different drawings may indicate similar or identical items.

DETAILED DESCRIPTION

Figure 1:
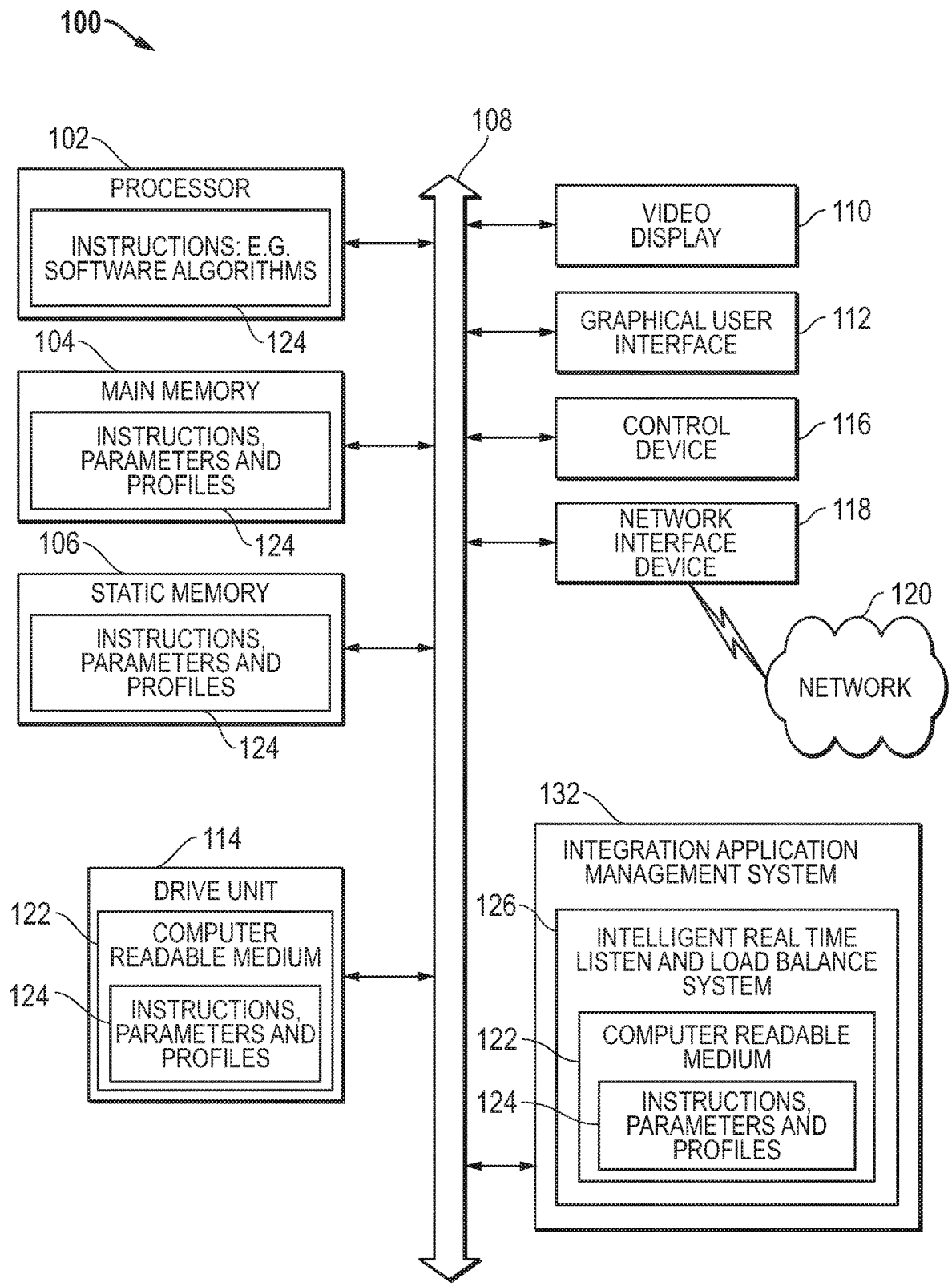
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Current methods of transacting business between or among a plurality of business entities involve the use of multiple software applications, application programming interfaces (APIs), or integration processes to transfer shared data among the plurality of businesses. Each of these business entities may use a different structure or method for receiving and storing the same type of information, causing each of these multiple applications, APIs, or integration processes to be customized to a particular business or group of businesses among which the same data may be shared. Embodiments of the present disclosure allow businesses to perform such necessary customization using an integration process modeling graphical user interface (GUI) that allows a user to model each step of the data sharing among the various businesses, using visual icons or "shapes" representing units of work to be performed within the integration process, such as integration process connectors. An integration application management system managing such an integration process modeling GUI in embodiments described herein may generate the code instructions for performing this necessary customization of an integration process for a particular user's needs, and transmit these code instructions, along with a runtime engine for remote execution of those code instructions at another location, for example, within an enterprise user's network, or in a cloud computing environment. In such a way, users may customize integration processes using these visual elements or shapes connected together in steps to form an end to end business integration process, without having to learn the underlying computer language that will execute these steps.

Users of the integration process modeling GUI may model several integration processes, some of which may be dependent upon the occurrence of other events. In previous systems, such integration processes' executions could be preset by the user to occur according to a known schedule (e.g., once per day, once per week, every two minutes, etc.) via the start shape. Such a preset and rigid schedule may prompt the integration process to execute, regardless of the true necessity for running that integration process.

In some scenarios, it may be more efficient to execute the integration process only when occurrence of a specific event triggers a need for the integration process to execute. For example, such a triggering event may include receiving datasets describing an online purchase via an online marketplace. This may prompt a need to execute an integration process for transmitting the order to a fulfillment center, updating inventory information, and starting a new tracking number for delivery of the purchased items. Such an integration process in embodiments may be modeled using a "start" connector element, which may be customized to "listen" for occurrence of this triggering event (e.g., receipt of datasets describing an online purchase). Such a customized "listener" start element may prompt the integration process to execute, regardless of the substance of the online purchase, or the performance, success, or necessity of the occurrence of the triggering event. For example, the integration process may include the step of starting a new tracking number for delivery of the purchased items, simply in response to the receipt of the purchase order. This may not take into account the fact that the purchase order specified the item would be picked up in store, rather than being delivered.

As another example, prior systems may allow a user to set an integration process for updating a customer's payment information upon receipt of the online purchase order from that customer. In such an example embodiment, the integration process may execute each time a new online purchase order is received, regardless of whether such a purchase order included the customer's billing information, or the customer gave permission to store such billing information. As yet another example, prior systems may allow an integration process for updating inventory for items in stock upon receipt of the online purchase order. In such an example embodiment, the integration process may execute each time a new online purchase order is received, regardless of whether that customer purchased a service or an item in stock. Thus, a system capable of triggering execution of integration processes based on a real-time analysis of the substance and execution of the triggering event (e.g., whether specific types of datasets were changed or received) is needed.

Further, in some circumstances, the volume of datasets created, read, updated, or deleted pursuant to a single triggering event (e.g., receipt of an online purchase order) makes user-assignment of a triggering event to specific or individual dataset difficult or impracticably complex. Some metadata describing the triggering event may include proprietary information or information understood only by specific units within an organization, not including the Information Technology (IT) specialist modeling the process the integration process triggered by the triggering event. For example, metadata associated with a triggering event of receiving an online customer purchase order may include a categorization for the item purchased that is only understood by the marketing department. Such categorization may be used by the marketing department, for example, to track previous purchases by each customer in order to generate targeted ad campaigns for that customer via social media. In such a scenario, the IT specialist assigning the triggering event for the integration process (e.g., updating inventory numbers) may not know whether to set the triggered integration process to execute upon receipt of such a categorization, because she does not understand the purpose for such a categorization. Further, in some embodiments, the datasets created or changed as part of the triggering event may be managed by an organization, company, or enterprise other than the enterprise that models and executes the triggered integration process. In such a scenario, the metadata associated with the triggering event may include a proprietary categorization not understood or used in any way by the enterprise executing the triggered integration process. This is only one example of many possible scenarios in which the metadata associated with a triggering event may be underutilized, and an opportunity for more efficient execution of triggered integration processes may be missed.

A more efficient system that is capable of executing integration processes based on a real time, machine intelligence analysis of the metadata associated with the triggering event is needed, in order to avoid unnecessary and repeated executions of triggered integration processes. Embodiments of the present disclosure provide for an enhanced connector software developer kit (SDK) functionality available to users modeling integration processes. The enhanced SDK functionality allows for a custom plug in to be used with connectors formation having an intelligent listener API to conduct real-time determinations for novel changes to datasets pursuant to triggering events in some embodiments. For example, changes to input data sources made during a triggering event that are relevant datasets to a triggered integration process may be detected in real time. Embodiments of the present disclosure may use a trained triggering event correlating neural network to determine an optimal time or instance for executing a triggered integration process, based on metadata associated with the triggering event. Such a triggering event correlating neural network in embodiments may be trained to optimize a specific pair of triggering event and triggered integration process based on analyzed metadata associated with a triggering event and on metadata within execution logs for previous executions of the triggered integration process.

An intelligent real time listen and load balance system in embodiments described herein may train the triggering event correlating neural network to detect, based on these sets of metadata, when changes to a specific dataset in a triggering event resulted in a change to another dataset made pursuant to an execution of the triggered integration process. Such a change in datasets may be referred to herein as dataset maintenance, and may include the creation, reading, updating, or deletion of datasets. Triggered integration process executions may be said to co-occur with a triggering event when the user has set the triggered integration process to execute upon detection of the occurrence of the triggering event, for example. In other words, the intelligent real time listen and load balance system may determine a correlation between a specific aspect or performance of the triggering event resulting in changes to this specific dataset and the triggered integration process. This correlation may be made based on the entirety of metadata associated with each triggering event and metadata stored within each execution log for the triggered integration process, and does not require understanding by the intelligent real time listen and load balance system of what each dataset represents.

Upon determining a correlation between a specific aspect or performance of the triggering event and the triggered integration process, the intelligent real time listen and load balance system in embodiments may automatically set the triggered integration process to execute upon execution of the correlated aspect of the triggering event. In such a way, the intelligent real time listen and load balance system in embodiments may more efficiently schedule execution of triggered integration processes using a real time, machine intelligence analysis of the outcome of the triggering event.

In addition to optimizing scheduling of a triggered integration process' execution, embodiments of the present application may also optimize selection of the computing resource used to execute such a triggered integration processes. As cloud computing services become more widely available and secure, many businesses have shifted executions of at least some of their computing processes to such remote, widely scattered cloud computing resources, referred to herein as cloud computing nodes. Cloud computing services allow users to move computing activities away from on-site servers and infrastructure owned by the user to servers and infrastructure (e.g., cloud computing nodes) located remotely from the user, but interconnected via the world wide web. This allows users to avoid over or under purchasing servers or other computing infrastructure, as well as paying the related maintenance overhead. Also, many of these cloud computing services allow users to scale up or scale down the number of servers or nodes required to accomplish that user's computing processes, as that need dynamically changes.

Such cloud computing nodes may be located in server facilities widely dispersed across the globe, and organized into regions. Some of these services allow users to select specific regions, or even specific nodes for execution of a given process. Users may make such decisions based on very high level performance metrics gathered at each cloud computing node in some circumstances. For example, a user may select a cloud computing node with a higher throughput over a cloud computing node with a lower throughput to execute any given integration process, simply because the cloud computing node with higher throughput appears to have more available computing capacity.

However, in some circumstances, determining an optimal cloud computing node for execution of a given integration process may depend on many factors, including performance metrics for available cloud computing nodes, as well as certain characteristics of the specific integration process the user wishes to execute. For example, the number of dropped packets may be the most important cloud computing node performance metric for determining where to execute an integration process for migrating a large volume of financial data, because erroneous or missed dataset migrations could cause discrepancies in user and customer accounts. As another example, latency may be the most important node performance metric for determining where to execute an integration process for updating an item inventory value during a cyber Monday sales event in which thousands of online purchases are performed each hour, in order to avoid selling out of stock items. Thus, a method is needed to determine an optimal cloud computing node for execution of a given integration process, in real-time, based on characteristics of the integration process and upon performance metrics at available cloud computing nodes.

Embodiments of the present disclosure address this issue by using an execution location optimizing neural network to determine an optimal cloud computing node for execution of a triggered integration process, at the time of a detected triggering event for that process. As described above, the intelligent real time listen and load balance system or a user in embodiments may identify a triggering event for a triggered integration process. In some embodiments of the present disclosure, upon detection that such a triggering event has occurred, by the intelligent real time listen and load balance system, the execution location optimizing neural network may determine an optimal cloud computing node for execution of the triggered integration process based on inputs characterizing the triggered integration process and inputs characterizing performance metrics for a plurality of available cloud computing nodes. In such a way, the intelligent real time listen and load balance system may make a real time assessment of the best location at which to execute the triggered integration process, just prior to its execution.

FIG. 1 is a block diagram illustrating an information handling system, according to an embodiment of the present disclosure. Information handling system 100 can include processing resources for executing machine-executable code, such as a central processing unit (CPU), a programmable logic array (PLA), an embedded device such as a System-on-a-Chip (SoC), or other control logic hardware used in an information handling system several examples of which are described herein. Information handling system 100 can also include one or more computer-readable media for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

FIG. 1 illustrates an information handling system 100 similar to information handling systems according to several aspects of the present disclosure. For example, an information handling system 100 may be any mobile or other computing device capable of executing a set of instructions (sequential or otherwise) that specify actions to be taken by that machine. In a particular embodiment, the information handling system 100 can be implemented using electronic devices that provide voice, video, or data communication. Further, while a single information handling system 100 is illustrated, the term "system" shall also be taken to include any collection of systems or sub-systems that individually or jointly execute a set, or multiple sets, of instructions to perform one or more computer functions.

Information handling system 100 can include devices or modules that embody one or more of the devices or execute instructions for the one or more systems and modules herein, and operates to perform one or more of the methods. The information handling system 100 may execute code 124 for the intelligent real time listen and load balance system 126, or the integration application management system 132 that may operate on servers or systems, remote data centers, or on-box in individual client information handling systems such as a local display device, or a remote display device, according to various embodiments herein. In some embodiments, it is understood any or all portions of code 124 for the intelligent real time listen and load balance system 126, or the integration application management system 132 may operate on a plurality of information handling systems 100.

The information handling system 100 may include a processor 102 such as a central processing unit (CPU), a graphics-processing unit (GPU), control logic or some combination of the same. Any of the processing resources may operate to execute code that is either firmware or software code. Moreover, the information handling system 100 can include memory such as main memory 104, static memory 106, drive unit 114, or the computer readable medium 122 of the intelligent real time listen and load balance system 126, or the integration application management system 132 (volatile (e.g. random-access memory, etc.), nonvolatile (read-only memory, flash memory etc.) or any combination thereof). Additional components of the information handling system can include one or more storage devices such as static memory 106, drive unit 114, and the computer readable medium 122 of the intelligent real time listen and load balance system 126, or the integration application management system 132. The information handling system 100 can also include one or more buses 108 operable to transmit communications between the various hardware components such as any combination of various input and output (I/O) devices. Portions of an information handling system may themselves be considered information handling systems.

As shown, the information handling system 100 may further include a video display 110, such as a liquid crystal display (LCD), an organic light emitting diode (OLED), a flat panel display, a solid state display, or other display device. Additionally, the information handling system 100 may include a control device 116, such as an alpha numeric control device, a keyboard, a mouse, touchpad, camera, fingerprint scanner, retinal scanner, face recognition device, voice recognition device, gesture or touch screen input device, or other input/output device.

The information handling system 100 may further include a graphical user interface 112. The graphical user interface 112 in an embodiment may provide a visual designer environment permitting a user to define integration process flows between applications/systems, such as between trading partner and enterprise systems, and to model a customized business integration process. The graphical user interface 112 in an embodiment may provide a menu of pre-defined user-selectable visual elements or shapes and permit the user to arrange them as appropriate to model a process and may be displayed on the video display 110. The elements may include visual, drag-and-drop icons representing specific units of work required as part of the integration process, such as invoking an application-specific connector, transforming data from one format to another, routing data down multiple paths of execution by examining the contents of the data, business logic validation of the data being processed, etc. These visual elements or shapes may be customizable such as via an SDK. The SDK for customizing the visual elements or shape operation may include various plug-ins such as that described in embodiments of the present disclosure. For example, an intelligent listener API plug-in according to some embodiments herein may be utilized with a shape such as start shape of a modeled integration process.

Further, the graphical user interface 112 allows the user to provide user input providing information relating to trading partners, activities, enterprise applications, enterprise system attributes, and/or process attributes that are unique to a specific enterprise end-to-end business integration process. For example, the graphical user interface 112 may provide drop down or other user-selectable menu options for identifying trading partners, application connector and process attributes/parameters/settings, etc., and dialog boxes permitting textual entries by the user, such as to describe the format and layout of a particular data set to be sent or received, for example, a Purchase Order. A user of the graphical user interface 112 in an embodiment may model multiple business integration processes, including triggered integration processes that are preset to execute upon the occurrence of a triggering event.

The information handling system 100 can represent a server device whose resources can be shared by multiple client devices, or it can represent an individual client device, such as a desktop personal computer, a laptop computer, a tablet computer, or a mobile phone. In a networked deployment, the information handling system 100 may operate in the capacity of a server or as a client user computer in a server-client user network environment, or as a peer computer system in a peer-to-peer (or distributed) network environment.

The information handling system 100 can include a set of instructions 124 that can be executed to cause the computer system to perform any one or more of the methods or computer based functions disclosed herein. For example, information handling system 100 includes one or more application programs 124, and Basic Input/Output System and Firmware (BIOS/FW) code 124. BIOS/FW code 124 functions to initialize information handling system 100 on power up, to launch an operating system, and to manage input and output interactions between the operating system and the other elements of information handling system 100. In a particular embodiment, BIOS/FW code 124 reside in memory 104, and include machine-executable code that is executed by processor 102 to perform various functions of information handling system 100. In another embodiment (not illustrated), application programs and BIOS/FW code reside in another storage medium of information handling system 100. For example, application programs and BIOS/FW code can reside in static memory 106, drive 114, in a ROM (not illustrated) associated with information handling system 100 or other memory. Other options include application programs and BIOS/FW code sourced from remote locations, for example via a hypervisor or other system, that may be associated with various devices of information handling system 100 partially in memory 104, storage system 106, drive unit 114 or in a storage system (not illustrated) associated with network interface device 118 or any combination thereof. Application programs 124, and BIOS/FW code 124 can each be implemented as single programs, or as separate programs carrying out the various features as described herein. Application program interfaces (APIs) such as WinAPIs (e.g. Win32, Win32s, Win64, and WinCE), proprietary APIs (e.g., for SalesForce® or Oracle's® NetSuite), or an API adhering to a known open source specification (e.g., Swagger™) may enable application programs 124 to interact or integrate operations with one another.

In an example of the present disclosure, instructions 124 may execute software for correlating a particular aspect of a triggering event with a triggered integration process based on previous occurrences of such a triggering event and previous executions of the triggered integration process, in order to identify an optimal triggering event for execution of the triggered integration process. In another embodiment, instructions 124 may execute software for determining an optimal cloud computing node at which to execute a triggered integration process, upon occurrence of a triggering event for that triggered integration process. The instructions 124 may also execute software of the integration application management system to automatically prompt the triggered integration process to execute upon detection of the triggering event, and automatically transmit code sets and a run-time engine for execution of the triggered integration process to the determined optimal cloud computing node in some embodiments. The computer system 100 may operate as a standalone device or may be connected, such as via a network, to other computer systems or peripheral devices.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The disk drive unit 114, and the intelligent real time listen and load balance system 126, or the integration application management system 132 may include a computer-readable medium 122 such as a magnetic disk, or a solid-state disk in an example embodiment. The computer-readable medium of the memory 104, storage devices 106 and 114, the intelligent real time listen and load balance system 126, or the integration application management system 132 may store one or more sets of instructions 124, such as software code corresponding to the present disclosure.

The disk drive unit 114, static memory 106, and computer readable medium 122 of the intelligent real time listen and load balance system 126, or the integration application management system 132 also contain space for data storage such as execution logs containing metadata describing previous executions of triggered integration processes. Connector code sets, and trading partner code sets may also be stored in part in the disk drive unit 114, static memory 106, or computer readable medium 122 of the intelligent real time listen and load balance system 126, or the integration application management system 132 in an embodiment. In other embodiments, data profile code sets, and run-time engines may also be stored in part or in full in the disk drive unit 114, static memory 106, or computer readable medium 122 of the intelligent real time listen and load balance system 126, or the integration application management system 132. Further, the instructions 124 of the intelligent real time listen and load balance system 126, or the integration application management system 132 may embody one or more of the methods or logic as described herein.

In a particular embodiment, the instructions, parameters, and profiles 124, and the intelligent real time listen and load balance system 126, or the integration application management system 132 may reside completely, or at least partially, within the main memory 104, the static memory 106, disk drive 114, and/or within the processor 102 during execution by the information handling system 100. Software applications may be stored in static memory 106, disk drive 114, the intelligent real time listen and load balance system 126, or the integration application management system 132.

Network interface device 118 represents a NIC disposed within information handling system 100, on a main circuit board of the information handling system, integrated onto another component such as processor 102, in another suitable location, or a combination thereof. The network interface device 118 can include another information handling system, a data storage system, another network, a grid management system, another suitable resource, or a combination thereof, and may communicate via a wired connection or wirelessly.

The intelligent real time listen and load balance system 126, or the integration application management system 132 may also contain computer readable medium 122. While the computer-readable medium 122 is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The information handling system 100 may also include the intelligent real time listen and load balance system 126, or the integration application management system 132, which may be operably connected to the bus 108. The intelligent real time listen and load balance system 126 is discussed in greater detail herein below.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a standalone device). The system, device, or module can include software, including firmware embedded at a device, such as an Intel® Core class processor, ARM® brand processors, Qualcomm® Snapdragon processors, or other processors and chipset, or other such device, or software capable of operating a relevant environment of the information handling system. The system, device or module can also include a combination of the foregoing examples of hardware or software. In an example embodiment, the intelligent real time listen and load balance system 126, or the integration application management system 132 and the several modules described in the present disclosure may be embodied as hardware, software, firmware or some combination of the same. Note that an information handling system can include an integrated circuit or a board-level product having portions thereof that can also be any combination of hardware and software. Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Figure 2:
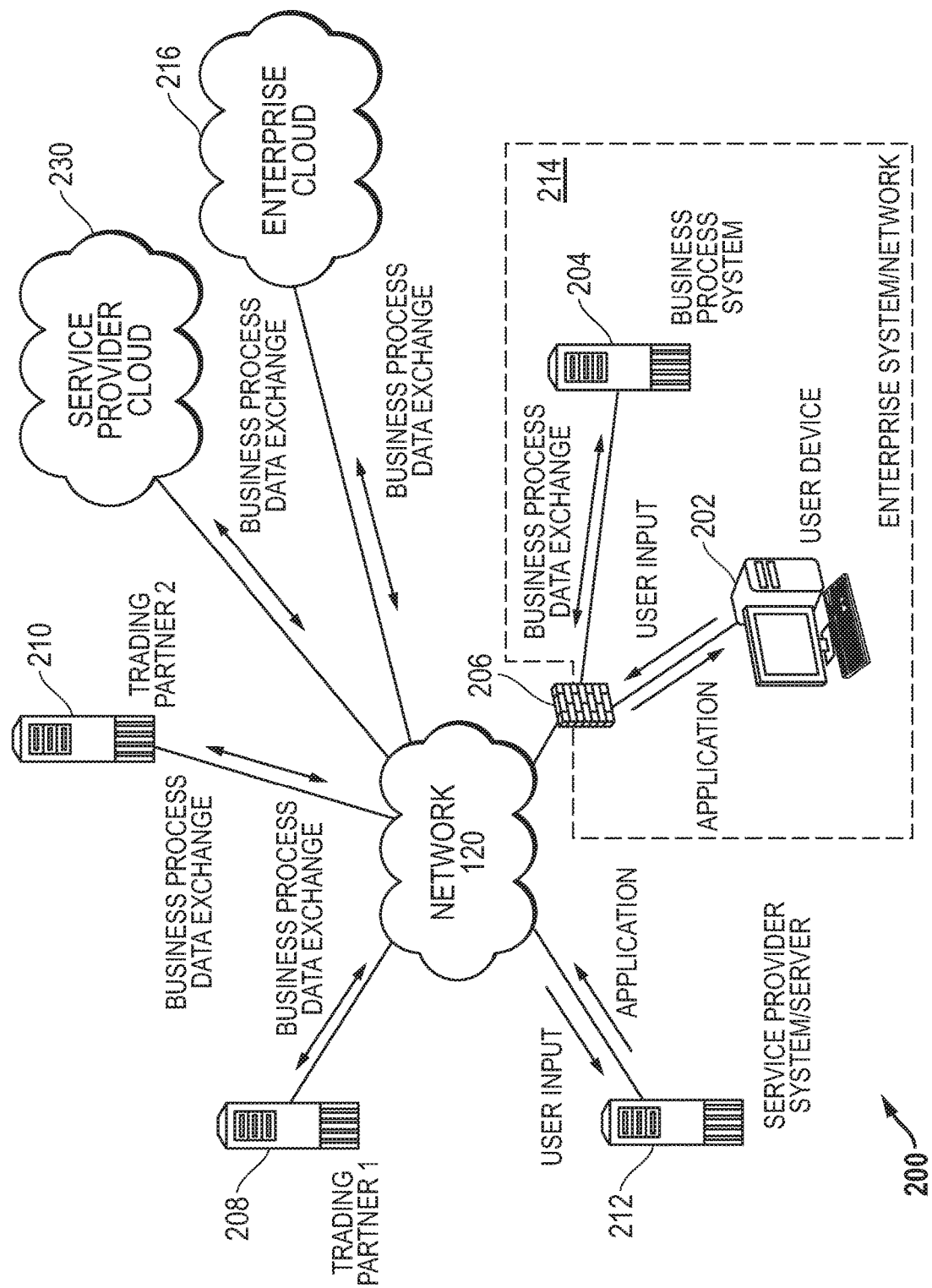
FIG. 2 is a block diagram illustrating a simplified integration network according to an embodiment of the present disclosure.

FIG. 2 is a graphical diagram illustrating a simplified integration network 200 including a service provider system/server 212 and an enterprise system/network 214 in an embodiment according to the present disclosure. Actual integration network topology could be more complex in some other embodiments. As shown in FIG. 2, an embodiment may include conventional computing hardware of a type typically found in client/server computing environments. More specifically, the integration network 200 in an embodiment may include a conventional user/client device 202, such as a conventional desktop or laptop PC, enabling a user to communicate via the network 120, such as the Internet. In another aspect of an embodiment, the user device 202 may include a portable computing device, such as a computing tablet, or a smart phone. The user device 202 in an embodiment may be configured with conventional web browser software, such as Google Chrome®, Firefox®, or Microsoft Corporation's Internet Explorer® for interacting with websites via the network 120. In an embodiment, the user device 202 may be positioned within an enterprise network 214 behind the enterprise network's firewall 206, which may be of a conventional type. As a further aspect of an embodiment, the enterprise network 214 may include a business process system 204, which may include conventional computer hardware and commercially available business process software such as QuickBooks, SalesForce's® Customer Relationship Management (CRM) Platform, Oracle's° Netsuite Enterprise Resource Planning (ERP) Platform, Infor's® Warehouse Management Software (WMS) Application, or many other types of databases.

In an embodiment, the integration network 200 may further include trading partners 208 and 210 operating conventional hardware and software for receiving and/or transmitting data relating to business-to-business transactions. For example, Walmart® may operate trading partner system 208 to allow for issuance of purchase orders to suppliers, such as the enterprise 214, and to receive invoices from suppliers, such as the enterprise 214, in electronic data form as part of electronic data exchange processes. Electronic data exchange process in an embodiment may include data exchange via the world wide web. In other embodiments, electronic data exchange processes may include data exchange via File Transfer Protocol (FTP) or Secure File Transfer Protocol (SFTP).

In an embodiment, a provider of a service ("service provider") for creating on-demand, real-time creation of customized data integration software applications may operate a service provider server/system 212 within the integration network 200. The service provider system/server 212 may be specially configured in an embodiment, and may be capable of communicating with devices in the enterprise network 214. The service provider system/server 212 in an embodiment may host an integration process-modeling user interface in an embodiment. Such an integration process-modeling user interface may allow a user to model an integration process including one or more sub-processes for data integration through a business process data exchange between an enterprise system/network 214 and outside entities or between multiple applications operating at the business process system 204.

The integration process modeled in the integration process-modeling user interface in an embodiment may be a single business process data exchange shown in FIG. 2, or may include several business process data exchanges shown in FIG. 2. For example, the enterprise system/network 214 may be involved in a business process data exchange via network 120 with a trading partner 1, and/or a trading partner 2. In other example embodiments, the enterprise system/network 214 may be involved in a business process data exchange via network 120 with a service provider located in the cloud 230, and/or an enterprise cloud location 216. For example, one or more applications between which a data set field value may be transferred, according to embodiments described herein, may be located remotely from the enterprise system 214, at a service provider cloud location 230, or an enterprise cloud location 216. In many environments, trading partners 208 or 210, service provider system/server 212, enterprise system/network 214, or other locations within an enterprise cloud 216 or the service provider cloud 230 may include a plurality of locations that may be used to obtain input source datasets, output transformed datasets, or execute one or more portions of an integration process according to various embodiments herein.

The user may use the integration process-modeling user interface in an embodiment to model one or more business process data exchanges via network 120 within an integration process by adding one or more connector integration elements or code sets to an integration process flow. These connector integration elements in an embodiment may model the ways in which a user wishes data to be accessed, moved, and/or manipulated during the one or more business process data exchanges. Each connector element the user adds to the integration process flow diagram in an embodiment may be associated with a pre-defined subset of code instructions stored at the service provider systems/server 212 in an embodiment. Upon the user modeling the integration process, the service provider system/server 212 in an embodiment may generate a run-time engine capable of executing the pre-defined subsets of code instructions represented by the connector integration elements chosen by the user or automatically edited by the intelligent real time listen and load balance system as described herein. The runtime engine may then execute the subsets of code instructions in the order defined by the modeled flow of the connector integration elements given in the integration process flow diagram. In such a way, an integration process may be executed without the user having to access, read, or write the code instructions of such an integration process.

In other aspects of an embodiment, a user may initiate a business process data exchange between one cloud service provider 230 and one cloud enterprise 216, between multiple cloud service providers 230, between multiple cloud computing nodes within a single cloud service provider 230 with which the enterprise system 214 has an account, or between multiple cloud enterprise accounts 216. For example, enterprise system 214 may have an account with multiple cloud-based service providers 230, including an Amazon® Web Services account, a cloud-based SalesForce® CRM account and a cloud-based Oracle® Netsuite® account. In such an example embodiment, the enterprise system 214 may initiate business process data exchanges between itself, the SalesForce® CRM service provider and the Oracle® Netsuite® service provider.

In some embodiments, the intelligent real time listen and load balance system may provide for real time analysis of data changes, function changes, or newly added data that may be determined via an intelligent listener API to prompt execution of a triggered integration process. This intelligent listener API may provide for efficiency of system usage and execution by providing for dynamic triggered integration process execution when datasets have been actively changed or newly added that are relevant to the triggered integration process execution to determine time or instances of execution of integration processes in some embodiments. Further, the intelligent real time listen and load balance system provide for the intelligent listener API may discern among performance levels from the plurality of locations or nodes in a network 200 to select optimal locations for real-time data retrieval and integration process execution locations on that data in some embodiments.

Figure 3:
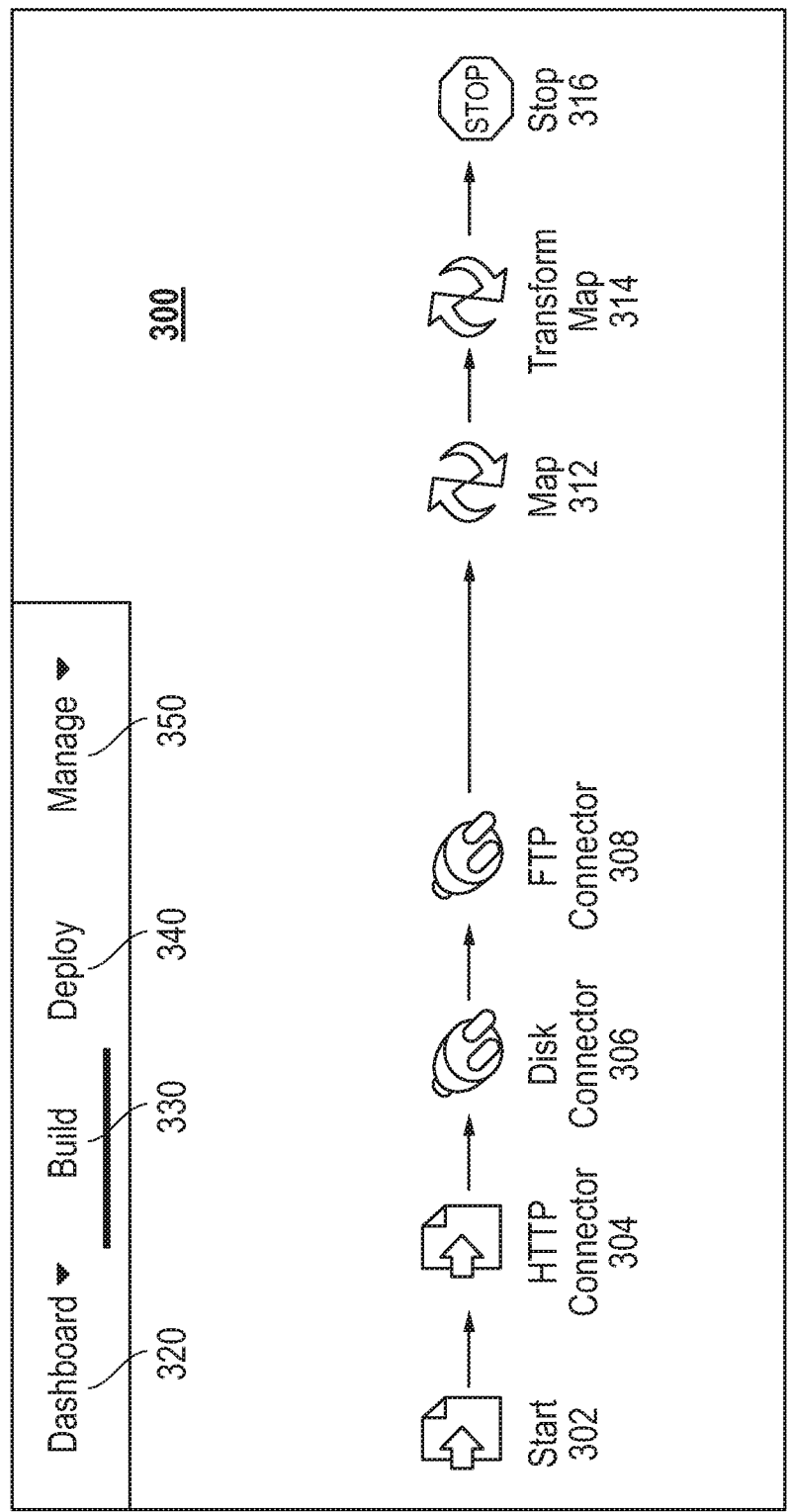
FIG. 3 is a graphical diagram illustrating a user-generated flow diagram of an integration process according to an embodiment of the present disclosure.

FIG. 3 is a graphical diagram illustrating a user-generated flow diagram of an integration process for exchange of electronic data records according to an embodiment of the present disclosure. The flow diagram for an integration process in an embodiment may be displayed within a portion of a graphical user interface 300 that allows the user to build the process flow, deploy the integration process modeled thereby (e.g., by selecting the deploy tab 340), manage dataset field values manipulated by such an integration process (e.g., by selecting the manage tab 350), and to view high-level metrics associated with execution of such an integration process (e.g., by selecting the dashboard tab 320). The user may build the integration process flow and view previously built process flow diagrams by selecting the "Build" tab 330 in an embodiment, such as via a drop down menu in embodiments. A user may generate a flow diagram in an embodiment by providing a chronology of process-representing integration visual elements via the use of an integration process-modeling user interface. In some embodiments, the integration process-modeling user interface may take the form of a visual user interface. In such embodiments, the user-selectable visual elements representing integration sub-processes (e.g. connector integration elements) may be visual icons.

An integration process-modeling user interface in an embodiment may provide a design environment permitting a user to define process flows between applications/systems, such as between trading partner and enterprise systems, between on-site data centers and cloud-based storage modules, or between multiple applications, and to model a customized business integration process. Such an integration process-modeling user interface in an embodiment may provide a menu of pre-defined user-selectable elements representing integration sub-processes and permit the user to arrange them as appropriate to model a full integration process. For example, in an embodiment in which the integration process-modeling user interface is a graphical user interface, the elements may include visual, drag-and-drop icons representing specific units of work (known as process components) required as part of the integration process. Such process components in an embodiment may include invoking an application-specific connector to access, and/or manipulate data. In other embodiments, process components may include tasks relating to transforming data from one format to another, routing data down multiple paths of execution by examining the contents of the data, business logic validation of the data being processed, etc.

Each process component as represented by integration shapes, icons, or visual elements may be identifiable by a process component type, and may further include an action to be taken. For example, a process component may be identified as a "connector" component. Each "connector" component, when chosen and added to the process flow in the integration process-modeling user interface, may allow a user to choose from different actions the "connector" component may be capable of taking on the data as it enters that process step. Further the integration-process modeling user interface in an embodiment may allow the user to choose the data set or data element upon which the action will be taken. The action and data element the user chooses may be associated with a connector code set, via the integration application management system, which may be pre-defined and stored at a system provider's memory in an embodiment.

As shown in FIG. 3, process-representing visual elements may include a start element 302, a HyperText Transfer Protocol (HTTP) connector element 304, a disk connector element 306, a file transfer protocol (FTP) connector element 308, a map element 312, a transform map element 314, or a stop element 316. Other embodiments may also include a branch element, a decision element, a data process element, or a process call element, for example. Each of the connector elements 304, 306, 308, and a start element 302 in an embodiment may represent a sub-process of an integration process describing the accessing and/or manipulation of data. The start element 302 in an embodiment may also operate as a connector element.

In an embodiment, a start element 302 may operate to begin a process flow, and a stop element 316 may operate to end a process flow. As discussed above, each visual element may require user input in order for a particular enterprise or trading partner to use the resulting process. The start element 302 in an embodiment may further allow or require the user to provide data attributes unique to the user's specific integration process, such as, for example, identifying or connecting to a source of incoming data to be integrated. A user may use a start element 302 to further define a location of such data, according to the language and storage structure understood by the application managing such data. For example, a start element 302 in an embodiment may define a web server receiving customer purchase requests for an online marketplace as a source of datasets to be migrated. Such a customer purchase request may include a plurality of datasets in an embodiment, with each dataset including a dataset field name identifying the type of data, and a dataset field value unique to that specific dataset. For example, a dataset may include a dataset field name "customer_fname" to indicate the customer's first name, and a dataset field value "John" to indicate the customer's first name is John. A customer purchase request may include, for example, a dataset for the customer's first name, the customer's last name, the customer's shipping address, the customer's billing address, the item the customer selected for purchase, the number of such an item the customer selected, as well as several datasets describing payment information for the customer.

Users may choose from various sub-types of connector visual elements in an embodiment. For example, an HTTP connector element 304 in an embodiment may operate to send or receive datasets to or from an HTTP-enabled server. In a specific example, the HTTP connector element 304 may operate to send datasets describing the shipping address for a customer purchasing an item in an online marketplace to the web-based interface for a shipping company hired to ship the item to the customer. The code set associated with HTTP connector element 304 in an embodiment may be written using basic HTTP commands, which may be easier to develop than developing a Simple Object Access Protocol (SOAP) specification for communication with such HTTP-enabled servers.

As another example, a disk connector element 306 in an embodiment may operate to read and write data sets from an underlying file system of the host machine in the user's enterprise network. For example, the disk connector element 306 in a specific embodiment may update a data set managed by the user's enterprise network to track inventory of the item purchased by the customer by decreasing the dataset field value associated with a dataset field name "units_available" by a value of one. Such datasets may be sent to directories on any disk to which the host machine has access, which may include trading partner's networks or machines, if such remote locations have granted the host machine Virtual Private Network (VPN) access.

In another example, an FTP connector element 308 in an embodiment may operate to download or upload files to an FTP-enabled server. Such a connector may access any FTP server connected to the internet, and may offer a viable alternative to a traditional Value Added Network (VAN), because there are no ongoing document fees when exchanging data via internet-based FTP. For example, the FTP connector element 308 in an embodiment may operate to upload datasets generated pursuant to a customer purchasing an item via an online marketplace and establishing a new customer account. Such datasets may include, for example, an identification of the customer, a password, shipping or billing information, or any other information the online retailer uses to automatically populate electronic fields for future purchase requests by the same customer.

A map element 312 may be used to transform data from one format to another. For example, a map element 312 in an embodiment may be used to convert a character to uppercase, change the format of a date or look up a value in a database. A transform map element 314 in an embodiment may associate a first data set field name for a data set field value being retrieved from a first application or source with a second data set field name under which that data set field value will be stored at a second application or destination. The stop element 316 in an embodiment may operate to terminate the integration process.

The integration application management system in an embodiment may associate each of the visual elements within the integration process-modeling graphical user interface with a set of code instructions written in a machine-readable, executable format. For example, the integration application management system in an embodiment may associate the start element 302 with a connector code set, written in a human-readable, machine-executable code language (e.g., JSON or XML), that includes code instructions for accessing a data set field value associated with a user-specified data set field name defined within the start element 302. Upon generation and storage within a memory of each of the code sets associated with each of the visual elements within the integration process-modeling graphical user interface 300 in an embodiment, the integration application management system may further generate a runtime engine capable of executing each of these code sets.

The integration application management system in an embodiment may transmit the runtime engine and each of the code sets for execution of the integration process modeled by the user via the integration process-modeling graphical user interface for execution of the integration process at a remote location (e.g., behind the firewall of a user's enterprise system/network, or at a node within a cloud computing infrastructure). In such a way, users of the integration process modeling GUI 300 may customize their integration processes by modeling them with these visual elements. Such a modeling process may negate a need for the user to learn the underlying computer language in which the integration process code instructions are actually written.

Figure 4:
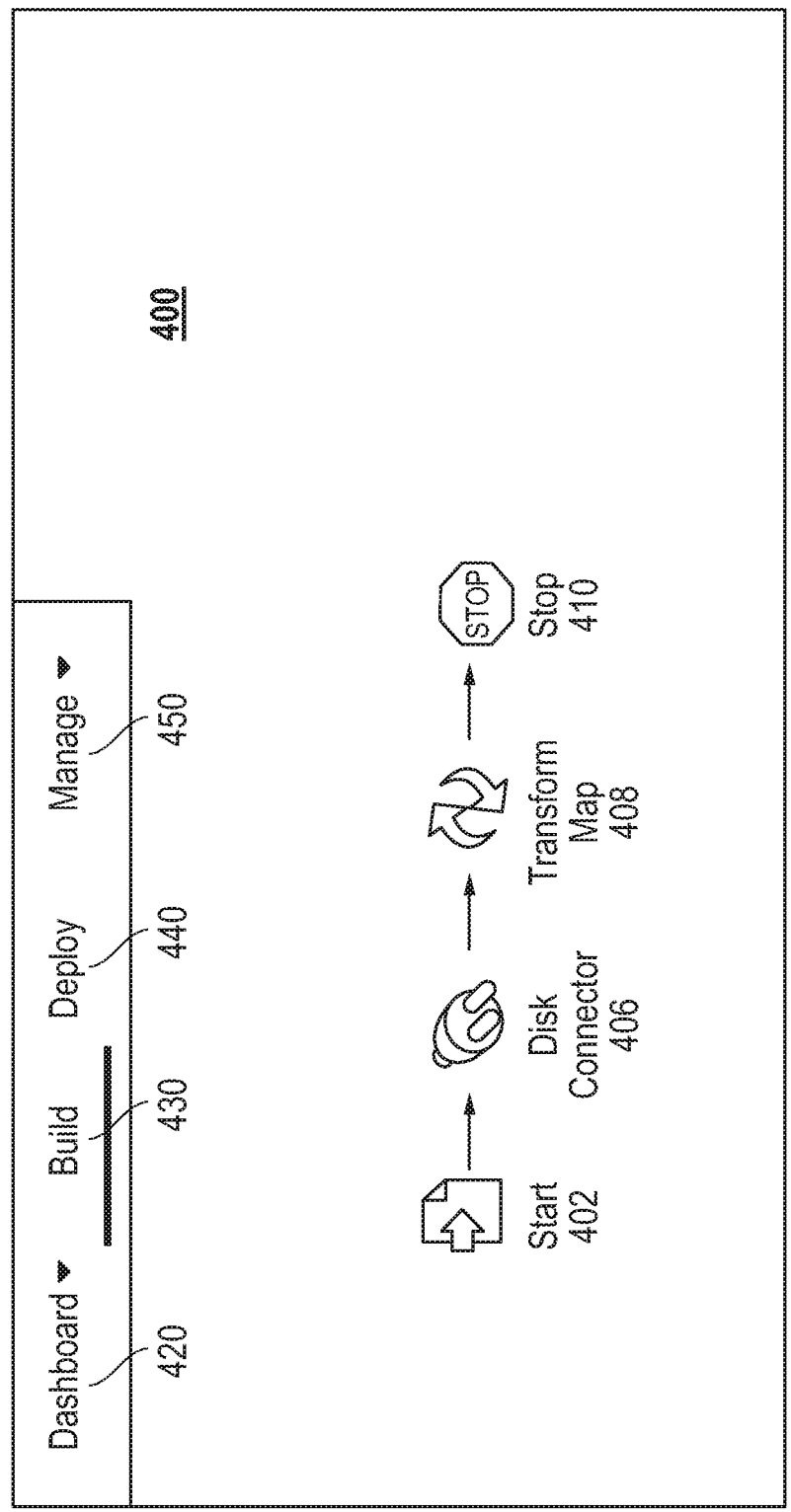
FIG. 4 is a graphical diagram illustrating a user-generated flow diagram of an integration process according to another embodiment of the present disclosure.

FIG. 4 is a graphical diagram illustrating a user-generated flow diagram of a triggered integration process for exchange of electronic data records according to an embodiment of the present disclosure. The integration process modeled via the graphical user interface 400 in an embodiment may be a triggered integration process set to execute only upon a detected occurrence of a triggering event, for example.

The triggered integration process modeled using the graphical user interface 400 in an embodiment may, for example, begin with a start element 402. The start element 402 in an embodiment may be customized to perform a "listening" action. In such an embodiment, the user of the graphical user interface 400 may customize the start element 402 to continuously poll a repository of information tracking changes made to datasets. Such a repository may be managed by a party external to the enterprise executing the triggered integration process in some embodiments. For example, an enterprise company A may keep a log of all datasets created, updated, read, or deleted pursuant to its everyday business practices, and one of these changes to datasets managed by enterprise company A may trigger an integration process for enterprise company B. In other example embodiments, the changed datasets and the log of such changes may be managed by the same entity or enterprise that executes the triggered integration process.

The "listener" functionality within the start element 402 of such an integration process may continuously poll the repository of information tracking changes made to datasets to determine whether one or more datasets identified within the start element 402 have been changed (e.g., created, read, updated, or deleted). Such continuous polling may be set to occur according to a schedule in some embodiments (e.g., every one second, every one minute, every hour, etc.).

As described herein, in previous systems, this listener functionality may have prompted initiation of the remainder of the triggered integration process depicted at FIG. 4 simply upon determination that a triggering event has occurred, regardless of the details surrounding that triggering event (e.g., the ways in which the dataset identified within the start element 402 were changed). In other words, the start element 402, customized with such listener functionality in previous systems may determine that one or more datasets identified within the start element 402 has been changed, and immediately initiate the remainder of the integration process modeled at FIG. 4, without accessing or analyzing any metadata associated with triggering event at the repository tracking changes made to datasets, potentially resulting in unnecessary execution of the triggered integration process. The intelligent real time listen and load balance system in an embodiment may operate to optimize the timing of triggered integration process executions, based on analysis of the metadata associated with a triggering event and metadata describing previous executions of the triggered integration process (e.g., modeled at FIG. 4), in order to avoid such unnecessary executions.

The start element 402 in an embodiment may also operate to retrieve or receive one or more of the plurality of datasets manipulated during the triggering event (e.g., describing a customer's purchase request). More specifically, the start element 402 may operate to retrieve or receive a dataset identifying the item the customer wishes to purchase, and a shipping address for delivery.

In such an embodiment, the visual element 406 may represent a disk connector operating to transmit a purchase order (or several datasets for filling out such a purchase order) to a fulfillment center managed by the user modelling the triggered integration process. In another example embodiment, the visual element 406 could represent a disk connector operating to store a new payment method submitted by the customer within a directory managed by the user (online marketplace owner) for later use in auto-populating fields for future purchases. In still another example, the visual element 406 could be a mail connector element operating to transmit an e-mail to a customer-provided e-mail address providing updated location information tracking the delivery of the item, once the item has left the distribution center. In yet another embodiment, the visual element 406 could be a disk connector operating to record an item or service category for the customer's purchase, for later use in generating targeted ads for that customer.

As described herein, triggered integration processes set to occur each time a triggering event is detected may cause the triggered integration processes to execute, regardless of the outcome of the triggering event (e.g., ways in which datasets are manipulated during a triggering event). While it may only be necessary to the triggered integration processes upon occurrence of the triggering event, it does not necessarily follow that the triggered integration process must be executed each time the triggering event occurs. In some scenarios, it may be more efficient to execute the triggered integration process only when the triggering event manipulates data in a specific way.

For example, a triggering event in an embodiment may include receipt of datasets describing an online purchase via an online marketplace. This may prompt a need to execute a triggered integration process, such as a process for transmitting the order to a fulfillment center, updating inventory information, or starting a new tracking number for delivery of the purchased items. Thus, the triggered integration process modeled via the GUI 400 may efficiently be set to execute each time the triggering event occurs in an embodiment in which the visual element 406 is a disk connector operating to transmit a purchase order to a fulfillment center.

However, other triggered integration processes may more efficiently only be triggered by the receipt of an online purchase order if that online purchase interaction includes certain types of information. For example, it may be inefficient to execute the triggered integration process, such as modeled via the GUI 400, each time an online purchase order is received in an embodiment in which the visual element 406 is a disk connector operating to store a new payment method submitted by the customer. It may be most efficient, conversely, to only execute such a triggered integration process when the billing information provided by the customer in the received online purchase order constituting the triggering event has been approved by the customer for storage by the user, or includes some new information not previously associated with that customer. For example, such a triggered integration process may be efficiently executed if the customer provides a new billing address that does not match the billing address associated with that customer, or a new payment method not currently associated with that customer within the stored datasets managed by the user (marketplace owner).

As another example, it may be inefficient to execute the triggered integration process modeled, such as via the GUI 400, each time an online purchase order is received in an embodiment in which the visual element 406 is a connector operating to update inventory information. It may be most efficient, conversely, to only execute such a triggered integration process only when the metadata associated with the receipt of the online purchase order reflects the customer purchases an item, rather than a service that is not counted within inventory. For example, such a triggered integration process may be efficiently executed if the metadata associated with the triggering event (e.g., receipt of the online purchase order) identifies an item being purchased, rather than a service.

As yet another example, it may be inefficient to execute the triggered integration process modeled via the GUI 400 each time an online purchase order is received in an embodiment in which the visual element 406 is a connector operating to associate the customer with an item or service category for the purchased item or service, for later use in generating targeted ads for that customer on social media. It may be most efficient, conversely, to only execute such a triggered integration process when the metadata associated with the triggering event (e.g., receipt of the online purchase order) reflects the item or service purchased by the customer is associated with such a category. For example, such a triggered integration process may be efficiently executed if the metadata associated with the triggering event includes identification of such a category.

In such example embodiments, executing the triggered integration process immediately upon receipt of an online purchase order (e.g., a detected occurrence of a triggering event), even if the metadata associated with the receipt of the online purchase order does not include billing information, identification of a purchased item, or identification of an item or service category, may result in unnecessarily replacing stored datasets with fresh, but identical datasets. Such unnecessary transfers of datasets, especially when performed in the context of high-volume users (e.g., online retailers) may significantly impact performance of other integration processes needing to execute in a timely manner, and may unnecessarily drain computing resources.

The graphical user interface 400 in an embodiment may allow users to set triggered integration processes to execute upon occurrence of triggering events reflecting specific types of changes (e.g., creation, reading, updating, or deletion) to specifically identified datasets, as described in metadata associated with triggering events within the repository of information tracking dataset changes, via an intelligent listener API operating with an intelligent real time listen and load balance system. In such systems, upon occurrence of the triggering event, an analysis of the metadata associated with that triggering event within the repository of information tracking dataset changes may list or provide information needed to infer whether the triggering event included the specific change to the specifically identified datasets defined by the intelligent listener API. For example, metadata associated with a triggering event in the repository of information tracking dataset changes in an embodiment may indicate whether datasets associated with customer billing information have been received, as well as whether those values were auto-populated (e.g., taken from billing information already associated with that customer in the user's enterprise system), or whether those values are related to a new billing method. In such an embodiment, the start visual element 402 may implement a trained, intelligent listener API having a trained triggering event correlating neural network that is set in an embodiment to engage only when the metadata associated with the triggering event indicates receipt of such a new billing method.

The start visual element 402 of the triggered integration process may also be set via a trained, intelligent listener API to engage in an embodiment only when the metadata associated with the triggering event at the repository of information tracking dataset changes indicates specifically identified datasets have been created, read, updated, or deleted during the triggering event. For example, the start visual element 402 of a triggered integration process with an intelligent listener API for updating inventory may be set to engage in an embodiment (and thus trigger execution of the integration process modeled at FIG. 4) only when the metadata associated with the triggering event indicates datasets specifically identifying items within inventory have been created, read, updated, or deleted pursuant to the receipt of a customer purchase order that constitutes the triggering event. As another example, the start visual element 402 of a triggered integration process with an intelligent listener API for associating a customer with an item or service category (e.g., for later use in generating targeted ads for that customer in social media) may be set to engage in an embodiment only when the metadata associated with a triggering event indicates datasets specifically identifying such an item or service category have been created, read, updated, or deleted during this triggering event.

The setting of execution of a triggered integration process based on an occurrence of a triggering event may be referred to herein as applying a "listener" to the triggered integration process. Such a "listener" may be set using a variety of drop-down menus or text entry interfaces within the integration process modelling GUI 400. These drop-down menus or text entry interfaces in an embodiment may allow a user, for example, to set the triggered integration process modeled at FIG. 4 to "listen" for occurrence of a triggering event, or to "listen" for particular changes in particular datasets made during occurrence of a triggering event, as reflected in metadata associated with the triggering event at a repository of information tracking dataset changes.

In some circumstances, the volume of datasets created, read, updated, or deleted during a triggering event, and thus referenced within its associated metadata in the repository of information tracking dataset changes, makes selection of the specific datasets whose changes most efficiently prompt execution of the triggered integration process difficult or impracticably complex for a user. In such scenarios, the metadata associated with the triggering event may be underutilized, and an opportunity for more efficient execution of triggered integration processes may be missed. As is described in greater detail herein, embodiments of the present disclosure address this issue by using a trained triggering event correlating neural network as part of a trained, intelligent listener API for example, to determine an optimal time for executing a given triggered integration process, based on metadata associated with a triggering event within the repository of information tracking dataset changes. The metadata associated with a triggering event in such a way may include recorded data maintenance events.

Figure 5:
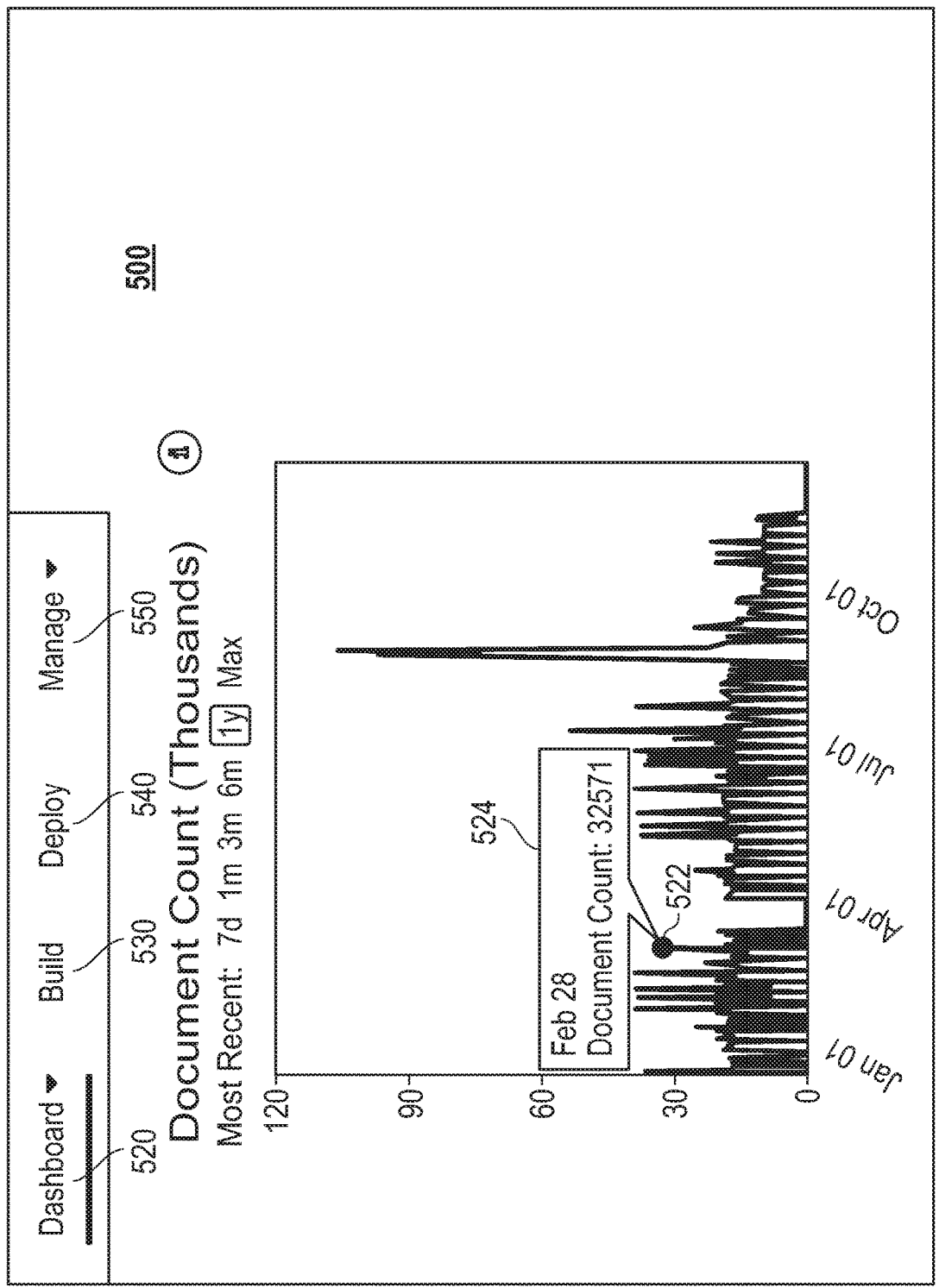
FIG. 5 is a graphical diagram illustrating number of documents transmitted over time according to an embodiment of the present disclosure.

FIG. 5 is a graphical diagram illustrating number of documents transmitted pursuant to executions of an example user's integration process over time according to an embodiment of the present disclosure. The integration application management system in an embodiment may gather metrics about executed integration processes in an embodiment in order to analyze performance of ongoing or repeated executions of any given integration process. For example, following execution of the integration process code sets associated with the visual elements selected by the user in the graphical user interface for an integration process, the integration application management system in an embodiment may determine the number of documents transmitted or migrated pursuant to that integration process, or across several integration processes. Such execution metrics and additional aspects such as execution times, types of changes to datasets, and other aspects are an example of integration process metrics recorded by integration process execution logs that may be used for various neural network training purposes as described herein. The execution logs may record these various dataset maintenance events that occur during execution of triggered integration processes developed pursuant to GUI modelled integration processes developed under an integration application management system. A user may select the dashboard tab 520 to view a plot 500 depicting the number of documents transmitted during each of several executions of the same integration process over a period from January through October. By clicking on a specific point 522 within the plot 500, the user may view a pop-up window 524 describing the number of documents executed in a single execution of such an integration process in an embodiment. The document counts and times shown in FIG. 5 are examples only for illustration. It is contemplated that such document counts and other recording of dataset maintenance events may differ widely from time to time or among various integration processes and may depend on volumes of datasets or complexity of business process integrations.

The integration application management system in an embodiment may record and store metrics such as the number of documents migrated during each execution of a given integration process, the number of each type of visual element included in the modeling of such an integration process, and the time to completion of each integration process, among other details. Each of these metrics may be gathered from execution logs transmitted to the integration application management system from the remote execution locations of those integration processes (e.g., behind a user's firewalled enterprise system, or at various cloud computing nodes) in an embodiment. In such a way, the integration application management system in an embodiment may gather and store data tracking various integration process execution metrics. In an embodiment, the intelligent real time listen and load balance system may input one or more of these integration process execution metrics from a triggered integration process into a triggering event correlating neural network, along with metadata associated with the triggering event identified within the start visual element modeling the triggered integration process, in order to identify an optimized triggering event that optimizes timing of the triggered integration process' executions, as described in greater detail with respect to FIG. 7. The intelligent real time listen and load balance system in another embodiment may input one or more of these integration process execution metrics from a triggered integration process into an execution location optimizing neural network in order to predict execution metrics for that triggered integration process at one of several available cloud computing nodes and choose an optimal cloud computing node for such an execution, as described in greater detail with respect to FIG. 8.

Figure 6:
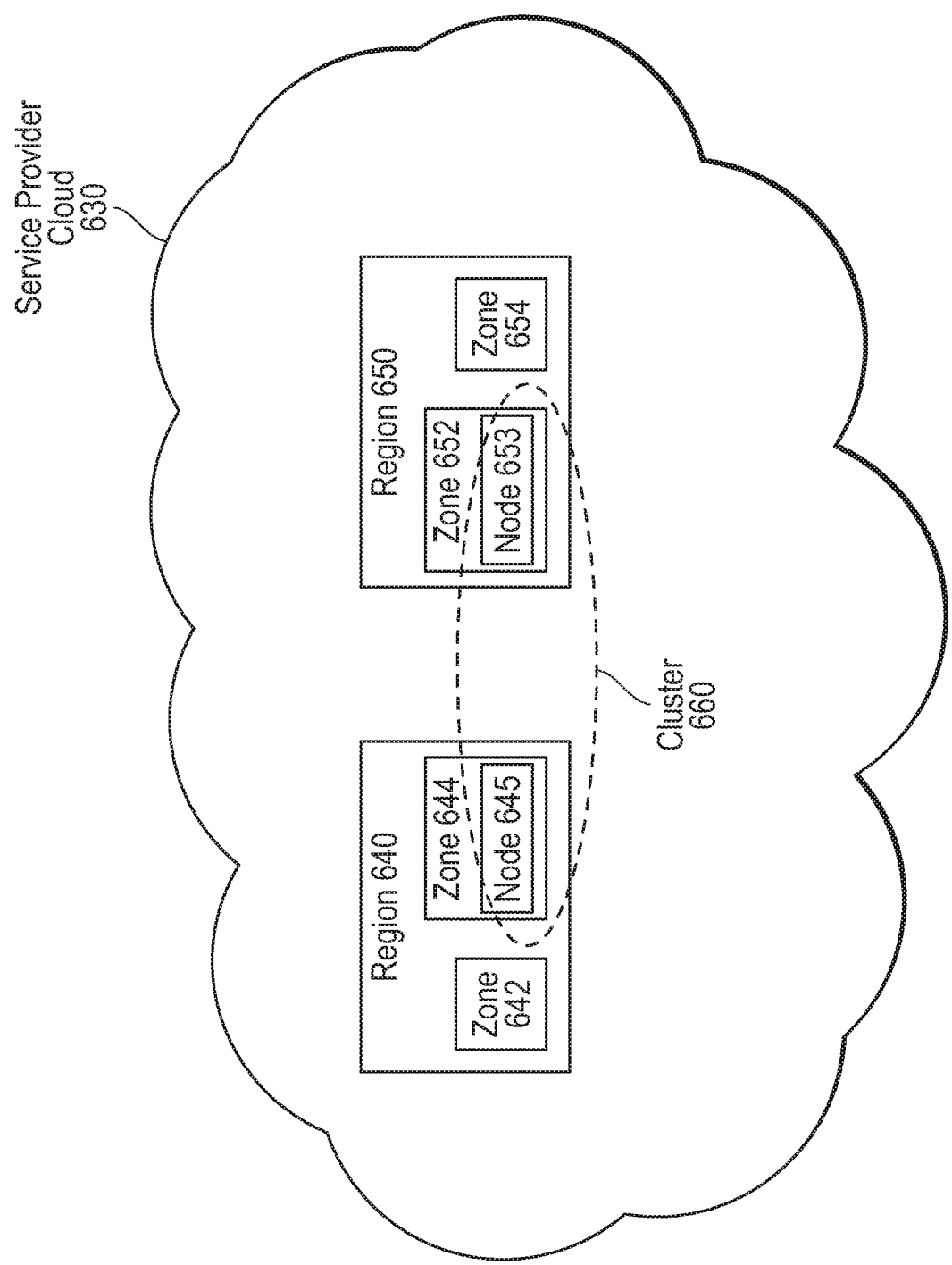
FIG. 6 is a graphical diagram illustrating a plurality of cloud computing nodes in an embodiment according to the present disclosure.

FIG. 6 is a graphical diagram illustrating a plurality of cloud computing nodes available for execution of a triggered integration process in an embodiment according to the present disclosure. A service provider may host an infrastructure of computing resources within a cloud 630 in an embodiment. The Amazon® Web Services (AWS®) platform is one example of such a cloud 630. The cloud 630 may include a plurality of nodes, each representing an address-specified (e.g., TCP/IP, port address, HTTP) computing resource, such as a physical or virtual server. Each of the plurality of nodes or servers may be housed in a data center, and several data centers (and their respective servers) may be networked together to form an extension for an enterprise cloud 630. Portions of the cloud 630 may be retained for utilization as execution locations for an enterprise and considered an enterprise cloud.

In some embodiments, the servers within the cloud 630 may be located in several different physical locations in order to avoid any failures caused by local power failures, interruptions to local internet infrastructure, or other local complications capable of terminating a currently running computing process. In one embodiment, the cloud 630 may group the data centers hosting cloud computing nodes into geographic regions that are located near integration process source data input locations. For example, AWS® servers may store buckets of data to be retrieved for integration processes such as at region 640 describing the Western half of a service area and region 650 describing the Eastern half of a service area. For example, AWS® houses several thousand nodes within each physical data facility, and groups the data facilities into AWS® regions, such as "US-West" and "US-East" regions. Selection of geographical locations may yield different integration process performance as discerned from the neural network without needing to know the actual location. For example, distant locations, us as for AWS® database access may encounter increased chance of failure or greater latency over longer data travel distances in some embodiments. Security may also create performance issues in some examples.

Each region (e.g. 640, 650) in an embodiment may be further divided into zones based on various characteristics of the computing resources available within a given region. For example, zones may be defined based on available resources within a zone, or based on geographic location of the cloud computing resources available within the zone. AWS® groups its several thousand nodes within each region into availability zones, for example, which constitute individual data center facilities within a geographic region. For example, the US-West geographic region may include several data center facilities, with each facility being represented as a "zone." Further, each zone (e.g., data center) may include thousands of nodes (e.g., one or more linked servers). For example, zone 642 in an embodiment may represent a data center in Oregon, and zone 644 may represent a data center in Phoenix. Both of these zones 642 and 644 in an embodiment may fall within the US-West region 640. In another example, zone 652 in an embodiment may represent a data center in New York, and zone 654 may represent a data center in Atlanta. Both of these zones 652 and 654 in an embodiment may fall within the US-East region 650. Resources may differ among regions or zones as well as data traffic occupancy levels.

Users of such a cloud 630 in an embodiment may set their integration processes to execute at specific, address-identified nodes within these specific regions and zones. For example, a user of the integration process modeling GUI having an account with a service provider managing cloud 630 may specifically identify node 645 operating within the data center in Phoenix (e.g., zone 644) and node 653 operating within the data center in New York as the nodes at which one or more of that user's integration processes will operate. A user may choose to execute the same integration process at multiple nodes (e.g., both node 645 and 653) as part of a failover strategy in an embodiment, in order to avoid any process failures resulting from local failures at the Phoenix or New York data facilities, for example. In another aspect of an embodiment, a user may choose to execute different integration processes at different nodes as part of a load balancing strategy that optimizes efficiency of these executions. Load balancing, as described herein, refers to the distribution or processing tasks associated with a plurality of integration processes over a plurality of available nodes in a manner that is more efficient than pushing each of these tasks through a single node. The multiple nodes (e.g., 645 and 653) selected by the user for execution of one or more integration processes in an embodiment may constitute an integration process cluster 660.

The efficiency with which any given integration process may be executed in an embodiment may depend, at least in part, upon the traffic conditions currently experienced at an assigned zone or node and existing connections with available locations of data input source locations. For example, the efficiency with which data packets are being processed and transmitted to and from a node or a zone in an embodiment may be characterized by performance metrics such as bandwidth usage, throughput, latency, dropped packets, retransmission of transmission control protocol (TCP) acknowledgement requests, network availability, and network connectivity. These factors may comprise performance metrics describing current operating conditions at an address-specified cloud computing node in an embodiment.

In another aspect, the efficiency with which any given integration process may be executed in an embodiment may depend, at least partially, on characteristics of the integration process being executed. Some integration processes may be more complex than others (e.g., involving greater or fewer subprocesses), and may involve the transmission of a greater number of datasets than others. In addition, cloud computing nodes may have varying characteristics, making some cloud computing nodes more appropriate for certain types and volumes of integrated data than others. Existing load balancing techniques may dynamically dedicate cloud computing nodes of varying sizes to specific integration processes based solely on the characteristics of the integration process being executed. In embodiments of the present disclosure, the intelligent real time listen and load balance system may improve upon these techniques by identifying one or more performance metrics describing current operating conditions at any given node that are likely to impact execution performance for an integration process (e.g., a triggered integration process). The intelligent real time listen and load balance system may use an execution location optimizing neural network to predict one or more triggered integration process execution metrics based on such performance metrics describing current operating conditions at a node in order to identify an optimal node for execution of the triggered integration process, as described in greater detail with respect to FIG. 8.

Figure 7:
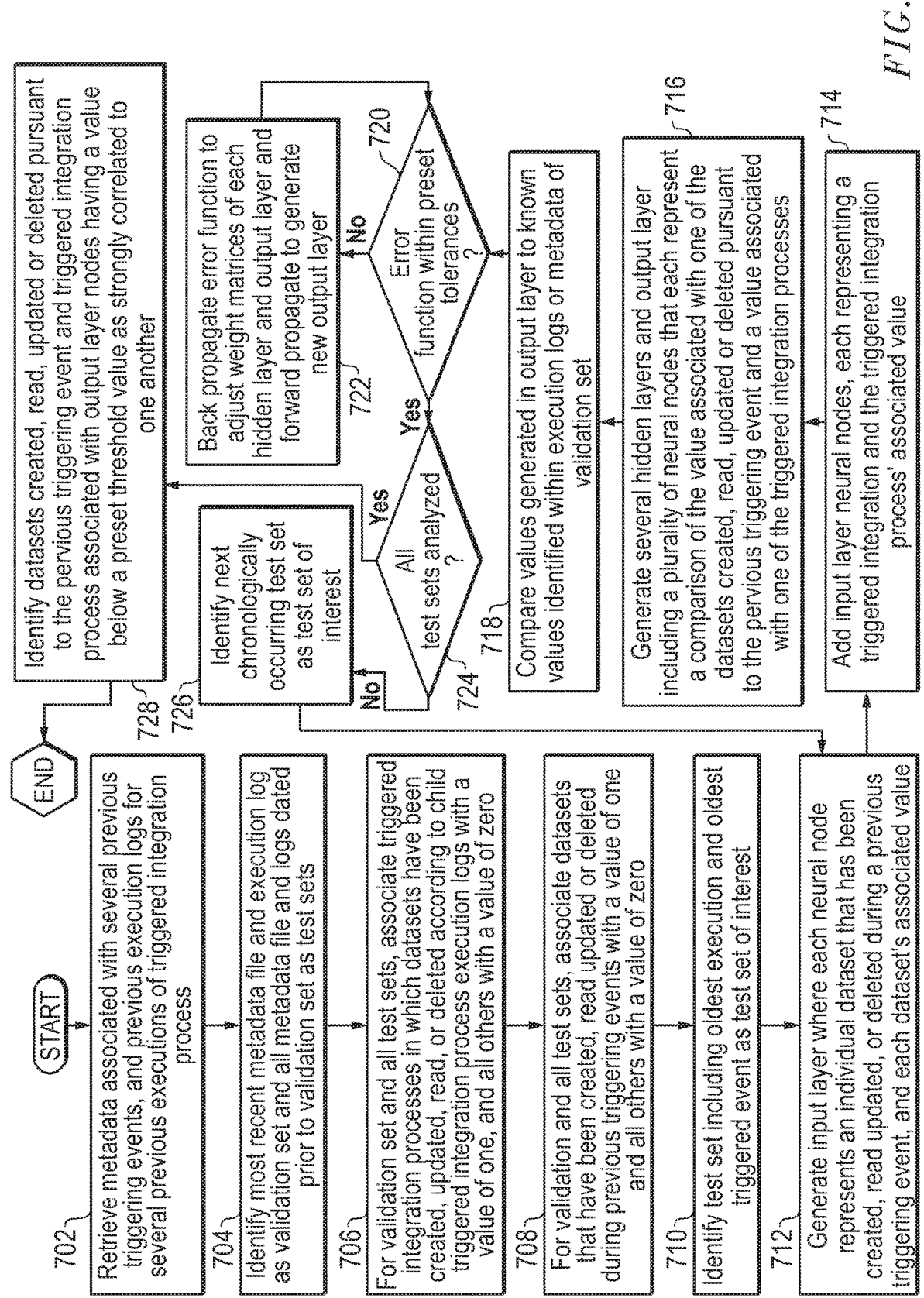
FIG. 7 is a flow diagram illustrating a method for training a triggering event correlating neural network according to an embodiment of the present disclosure.

FIG. 7 is a flow diagram illustrating a method for training a triggering event correlating neural network based on metadata associated with a user-assigned triggering event and execution logs for previous executions of an integration process triggered by that user-assigned triggering event according to an embodiment of the present disclosure. As described herein, in previous systems, triggered integration processes may be set to execute when the a triggering event resulted in changes made to a user-identified dataset in a specific way, resulting in a need to execute the triggered integration process. Prior systems allowed users to set triggered integration processes to execute upon occurrence of a triggering event, without analyzing the specific changes that were made, and to which datasets (as reflected in the metadata associated with the triggering event) during this triggering event. This results in underutilization of the power of metadata describing previous occurrences of triggering events, and previous executions of the triggered integration processes triggered thereby to project or estimate the most efficient timing of the triggered integration processes based on a real time analysis of metadata for the triggering event. The intelligent real time listen and load balance system in an embodiment may use a trained triggering event correlating neural network to determine an optimal time for executing a given triggered integration process, based on metadata associated with the triggering event at the repository of information tracking dataset changes. In such a way, the intelligent real time listen and load balance system may set triggered integration processes to execute only when certain conditions are met within the metadata associated with the triggering event.

At block 702 in an embodiment, the intelligent real time listen and load balance system may retrieve metadata associated with triggering events that occurred previously, and execution logs for previous executions of the integration process triggered thereby. The method of FIG. 7 in an embodiment may involve training of the triggering event correlating neural network for a single triggering event and a single triggered integration process. In other embodiments, plural triggering events or triggered integration processes may also be involved and embodiments herein may be understood to operate similarly according to embodiments herein. The intelligent real time listen and load balance system may retrieve metadata associated with the triggering event from the repository of information tracking dataset changes, and retrieve execution logs stored at the integration application management system in an embodiment. These execution logs may have been gathered and stored over a period of time, over which several executions of the integration process triggered by the triggering event may have taken place. For example, the intelligent real time listen and load balance system may retrieve metadata associated with each occurrence of a triggering event that has occurred daily over a thirty day period, for a total of thirty separate sets of metadata. As another example, the intelligent real time listen and load balance system may retrieve an execution log for each execution of a triggered integration process, triggered by occurrence of these triggering events, that has executed daily over a thirty day period, for a total of thirty previously stored triggered integration process execution logs.

In another embodiment in which the triggered integration process did not execute each time occurrence of the triggering event was detected, the intelligent real time listen and load balance system may retrieve all of the available triggered integration processes stored over a period of time (e.g., 15 triggered integration process execution logs for a triggered integration process executed every 48 hours over a 30 day period). In such an embodiment, the intelligent real time listen and load balance system may retrieve metadata from the repository of information tracking dataset changes for selective occurrences of the triggering event. For example, in an embodiment in which the intelligent real time listen and load balance system retrieves 15 execution logs for a triggered integration process executed every 48 hours over a 30 day period, the intelligent real time listen and load balance system may also retrieve the metadata associated with only the triggering event occurrences having the same dates or timestamps as the execution logs for the triggered integration process that have been retrieved. In such a way, the intelligent real time listen and load balance system may compare only triggering events likely to have triggered the triggered integration process and exclude triggering events that do not appear to be related to the triggered integration process.

These triggered integration process execution logs may be transmitted to the integration application management system by runtime engines executing the triggered integration processes at remote locations. For example, the runtime engine in an embodiment described with reference to FIG. 2 may execute a triggered integration process at the user enterprise system/network 214 and transmit an execution log detailing performance of such execution(s) to the service provider server/system 212. As another example, the runtime engine in an embodiment described with reference to FIG. 6 may execute a triggered integration process at a service provider cloud computing node 645 or 653 and transmit an execution log detailing performance of such execution(s) to the service provider server/system managing the integration application management system and the intelligent real time listen and load balance system. The execution logs in an embodiment may describe integration process execution metrics such as, for example, the number of datasets transacted during the execution (e.g., as described with reference to FIG. 5), the number of each type of visual element included in the modeling of such an integration process, and the time to completion of each integration process, among other details.

The intelligent real time listen and load balance system in an embodiment may identify the most recent triggering event metadata and most recent execution logs as a validation set and all execution logs and triggering event metadata dated prior to the validation set as test sets at block 704. For example, in an embodiment in which the intelligent real time listen and load balance system retrieves 30 execution logs for the triggered integration process, which executed daily for a month, and metadata associated with 30 triggering events, each occurring on a different day of the same month, the most recently dated executions logs stored on the last day of that month, and the metadata associated with the triggering event occurring on the last day of that month may be designated as the validation set. The execution logs for the triggered integration process having the same date as metadata for triggering events (e.g., the first day of the month) may be placed in a single test set. This may be repeated for all similarly dated sets of execution logs and triggering event metadata to create 29 total test sets, each including one execution log for the triggered integration process and one set of metadata for the triggering event. The test sets may be used to train the triggering event correlating neural network to estimate which aspects of the triggering event result in an actual need for execution of the triggered integration process. The validation set in an embodiment may be used to compare these estimations against known values and finely tune the weight matrices of the triggering event correlating neural network to produce more accurate estimations.

At block 706, for the validation set and all test sets, the intelligent real time listen and load balance system may associate the triggered integration processes in which datasets have been created, updated, read or deleted according to the triggered integration process execution logs with a value of one, and associate all other triggered integration processes with a value of zero. For example, in various embodiments described with reference to FIG. 4, occurrence of a triggering event may prompt execution of several different triggered integration processes, such as a process for transmitting the order to a fulfillment center, updating inventory information, updating customer billing information, or associating a customer with an item or service category. Such a triggered integration process modeled via the GUI 400 may execute each time the triggering event of receiving a customer purchase order occurs in an example.

The execution log for the triggered integration process modeled via GUI 400 in such an embodiment may describe each dataset that has been read, created, updated, or deleted pursuant to a specific, single execution of the triggered integration process. These functions may be referred to as dataset maintenance events. Further, consecutive triggered integration process execution logs may be compared to determine whether these dataset maintenance events actually resulted in the migration of new data. For example, an execution log for the triggered integration process on the first day of the month may indicate an inventory value for a specific item has been updated with a value of "5." If the execution log for the same triggered integration process on the second day of the month indicates the inventory value for the same specific item has been "updated" to "4," this may indicate the execution of the triggered integration process was necessary, because it reflects replacement of a stored dataset with current information (e.g., an inventory number that takes into account the purchase of one unit of the item). The intelligent real time listen and load balance system in such an embodiment may associate the triggered integration process within the test set for the second day of the month with a value of one, reflecting an efficient and needed execution of the triggered integration process.

In contrast, if the execution log for the same triggered integration process on the second day of the month indicates the inventory value for the same specific item has been "updated" to "5," this may indicate the execution of the triggered integration process was unnecessary because it simply replaced the stored dataset with an identical dataset. The intelligent real time listen and load balance system in such an embodiment may associate the triggered integration process within the test set for the second day of the month with a value of zero, reflecting an inefficient and unnecessary execution of the triggered integration process. This may further indicate that the triggering event that the user has assigned as a trigger for a need to execute the triggered integration process may need to be edited for more efficient execution of the triggered integration process.

For the validation set and all test sets, the intelligent real time listen and load balance system in an embodiment may associate datasets that have been created, updated, read, or deleted, according to metadata associated with triggering events with a value of one and associate all other datasets with a value of zero at block 708. For example, in an embodiment described with reference to FIG. 3, a triggering event may comprise the receipt of a customer purchase request for an online marketplace. Such a customer purchase request may include a plurality of datasets in an embodiment. For example, a customer purchase request may include a dataset for the customer's first name, the customer's last name, the customer's shipping address, the customer's billing address, the item the customer selected for purchase, the number of such an item the customer selected, as well as several datasets describing payment information for the customer.

The metadata associated with the triggering event (e.g., receipt of the customer purchase request) in such an embodiment may describe each dataset that has been read, created, updated, or deleted pursuant to a specific, single occurrence of the triggering event. For example, metadata for a single receipt of a customer purchase request (e.g., triggering event) may indicate that received customer purchase order included a change being made (e.g., creation, update, or deletion) to a dataset identifying a number of items purchased. However, the metadata for that single receipt of a customer purchase request may indicate that received customer purchase order did not include changes being made to a dataset associated with customer billing information, or a dataset associated with an item or service category. In such an embodiment, the intelligent real time listen and load balance system may associate individual datasets with either a zero or one. For example, the intelligent real time listen and load balance system may associate the dataset describing the number of items purchased, which the metadata reflects has been changed, with a value of one, while associating the datasets describing the customer billing information and item or service category information, which the metadata reflects have not been changed, with a value of zero.

At block 710, a test set including the oldest execution log and metadata associated with the oldest occurrence of a triggering event may be designated as the test set of interest. For example, in an embodiment in which the intelligent real time listen and load balance system retrieved 30 sets of executions logs and 30 sets of metadata for triggering events, each representing either a triggering event or a triggered integration process occurring over a month, the test set from the first day of that month may be designated as the test set of interest. In such an embodiment, the test set of interest may then comprise the metadata associated with the triggering event from the first day of that month, and the triggered integration process execution log from the first day of that month.

The intelligent real time listen and load balance system may generate an input layer for a triggering event correlating neural network at block 712. Each neural node within such an input layer in an embodiment may represent an individual dataset identified within the metadata associated with a triggering event, and each triggering event dataset's associated value, as assigned at block 708. For example, the input layer may include a neural node associating a dataset identifying a number of items purchased with the value one, a dataset identifying customer billing information with a value of zero, and a dataset identifying an item or service category with a value of zero, all as defined within the metadata for a single triggering event.

At block 714, additional neural nodes representing a single triggered integration process and its value designated at block 706 may be added to the input layer of the triggering event correlating neural network in an embodiment. For example, the intelligent real time listen and load balance system in an embodiment may also add a neural node associating a triggered integration process that operated to change the value of the inventory item with a value of one to the input layer of the triggering event correlating neural network. As another example, the intelligent real time listen and load balance system in an embodiment may also add a neural node associating a triggered integration process that operates to replace a stored dataset with an identical value with a value of zero to the input layer of the triggering event correlating neural network.

The intelligent real time listen and load balance system in an embodiment may generate several hidden layers and an output layer including a plurality of neural nodes that each represent a comparison of the value associated with one of the datasets identified in the metadata associated with a triggering event, and a value associated with one of the triggered integration processes at block 716. For example, a first neural node may reflect the difference between the value of one associated with a dataset identifying a number of items purchased, as shown in the metadata for the triggering event, and the value of one associated with a dataset updating an inventory number pursuant to visual element 406 in FIG. 4. Thus, such a first neural node may have a value of zero, indicating the triggering event and the triggered integration process both performed actual changes to these datasets. As another example, a second neural node may reflect the difference between the value of zero associated with the customer billing information dataset identified in metadata for the triggering event, with the value of zero associated with the storing of customer billing information relating to the triggered integration process. Such a second neural node may also have a value of zero, indicating neither the triggering event, nor the triggered integration process read, created, updated, or deleted customer billing information efficiently.

In both of these scenarios, the fact that the difference between the node representing aspects of the triggering event and the node representing aspects of the triggered integration process is zero indicates they may be appropriately interdependent. For example, it may be most efficient to update the inventory information via the triggered integration process when the triggering event includes receipt of a dataset identifying items in inventory have been purchased. As another example, it may be most efficient not to update the customer billing information via the triggered integration process when the triggering event did not result in receipt of a dataset identifying items in inventory have been purchased.

Thus, a value of zero associated with a neural node in the output layer may indicate a high degree of correlation between changes made to specific datasets during the triggering event for that node and changes made to the dataset via the triggered integration process for that node. In contrast, a value of one associated with a neural node in the output layer may indicate a lowest degree of such a correlation. For example, a third neural node may reflect the difference between the value of one associated with the dataset identifying the number of items purchased, as reflected in the metadata for the triggering event, and the value of zero associated with unnecessary replacement, via the triggered integration process, of a dataset identifying an item or service category with an identical dataset. In such a scenario, such a third neural node may have a value of one, indicating the dataset describing the number of items purchased, as shown in the metadata for the triggering event, may not correlate or relate in any way to the updating, via the triggered integration process, of an item or service category associated with a customer. The fact that the difference between the node representing aspects of the triggering event and the node representing aspects of the triggered integration process is one indicates they may not be interdependent. In other words, the decision of whether to update an item or service category associated with a customer, via the triggered integration process, may not depend at all upon whether the triggering event includes receipt of a purchase order identifying the number of items purchased.

Generation of the output layer by propagating the values of the neural nodes of the input layer through the many layers of the neural network may be referred to herein as a forward propagation of a training session. As described herein, as the training of the triggering event correlating neural network progresses through multiple test sets of execution logs and triggering event metadata in other training sessions, the values of these output nodes may change to values between zero and one. As described, the execution logs include records of various dataset maintenance events that may occur during execution of triggered integration processes pursuant to the GUI modeled systems of the business process integration application management system. Further, the metadata associated with triggering events may include records of various dataset maintenance events (in some instances to multiple datasets in a single metadata file) that may occur as part of a triggering event. Values closer to zero may indicate a higher degree of correlation, and values closer to one may indicate a lower degree of correlation.

At block 718, the intelligent real time listen and load balance system in an embodiment may compare the values generated in the output layer of the triggering event correlating neural network to known values identified within the triggering event metadata and triggered integration process execution logs of the validation set. As described at block 704, the validation set may contain the metadata associated with the triggering event with the most recent date (e.g., the last day of the month), and the triggered integration process execution log with the most recent date. Also, as described at block 716, the first node of the output layer trained using the first test set may have a value of zero and represent a difference between the value of one associated with a dataset identifying a number of items purchased, as reflected in metadata associated with the triggering event of the first test set, and the value of one associated with a dataset updating an inventory number pursuant to visual element 406, representing the integration process triggered by the triggering event of the first test set in FIG. 4. The validation set may have a value of zero associated with a dataset identifying a number of items purchased, as reflected in the metadata associated with the triggering event of the validation set, and a value of one associated with a dataset updating an inventory number pursuant to visual element 406, representing the integration process triggered by the triggering event of the validation set in FIG. 4. In such a scenario, the difference between these values with respect to the validation set may be one, while the difference between these values with respect to the first test set is zero. This may indicate the dataset identifying a number of items purchased is less highly correlated to the dataset updating an inventory number than reflected in the first test set alone.

The intelligent real time listen and load balance system in an embodiment may determine at block 720 whether an error function for the triggering event correlating neural network falls below preset tolerances. The difference between output node values generated using a test set of data and similarly generated values based on a validation set of data may be referred to as an error function for the triggering event correlating neural network in an embodiment. Such an error function may reflect a degree to which the neural network as it is trained using a first forward propagation of the first test set fails to accurately predict a correlation between a specific aspect of the triggering event (e.g., a change made to a specifically identified dataset) and a specific aspect of the triggered integration process. The most recent forward propagation of the test set of interest in an embodiment may sufficiently accurately predict a correlation between a specific aspect of the triggering event and a specific aspect of the triggered integration process if the error function is below a preset tolerance or threshold value. Such a threshold value may be set by the user, or automatically set by the intelligent real time listen and load balance system. For example, the preset tolerance may be 5%, indicating a 5% difference between the correlation predicted based on the metadata from the test set of interest, and the correlation known based on the metadata from the validation set. In other embodiments, the preset tolerance may have other values, such as, for example, 0.5%, 1%, 10% or 20%.

If the error function for the triggering event correlating neural network does not fall below preset tolerances, the method may proceed to block 722 for back propagation of the error function and tuning of the weight matrices of the triggering event correlating neural network. If the error function for the triggering event correlating neural network does fall below preset tolerances, the triggering event correlating neural network may be trained to determine an optimal triggering event for a specific triggered integration process based on the execution logs and triggering event metadata within the test set of interest. The method in such a scenario may then proceed to block 724 to determine whether the triggering event correlating neural network has been trained based on all available test sets.

At block 720, the intelligent real time listen and load balance system in an embodiment in which the error function did not fall within preset tolerances may back propagate the error function of the triggering event correlating neural network in order to adjust the associated weight matrices. Failure of the error function to meet preset tolerances in an embodiment may indicate the most recent forward propagation of the test set of interest does not sufficiently accurately predict a correlation between a specific aspect of the triggering event and a specific aspect of the triggered integration process. In order to more accurately provide such a correlation, the error function may be back-propagated through the multiple layers of the triggering event correlating neural network at block 722. Back propagation in an embodiment may operate to adjust weight matrices associated with each hidden layer and the output layer of the neural network. Such weight matrices may represent the degree to which the values of neural nodes in a later layer are impacted by the values of neural nodes in a previous layer.

Following such a back-propagation, the input layer of the triggering event correlating neural network may be again forward propagated at block 722 through the weight-adjusted layers of the network, to generate an updated output layer. This may result in one or more values of the neural nodes in the output layer having values between zero and one.

The method may then proceed back to block 720 to determine whether the updated error function is within the preset tolerances. By fine-tuning these weight matrices, the intelligent real time listen and load balance system in an embodiment may more accurately model the relationships between each of the neural nodes representing various aspects of the triggering event and various aspects of the triggered integration process. The loop between blocks 720 and 722 may be repeated until the weight matrices have been finely tuned to a degree sufficient to allow the triggering event correlating neural network to accurately predict when occurrence of specific aspects of a triggering event may trigger a need to execute the triggered integration process. The loop between blocks 712 and 720/722 in an embodiment may constitute a training session of the triggering event correlating neural network for the test set of interest. The method may then proceed to block 724 for potential further training of the triggering event correlating neural network based on other test sets.

At block 724, the intelligent real time listen and load balance system in an embodiment in which the triggering event correlating neural network has successfully been trained on a training set may determine whether all test sets have been used to train the triggering event correlating neural network. If all test sets have not yet been used to train the triggering event correlating neural network in an embodiment, the method may proceed to block 726 to identify a new test set of interest. If all test sets have been used to train the triggering event correlating neural network, the triggering event correlating neural network may be said to be fully trained, and the method may proceed to block 728 for identification of a specific aspect of the triggering event that triggers the most efficient execution of the triggered integration process.

At block 726, the intelligent real time listen and load balance system in an embodiment in which all test sets have not yet been used to train the triggering event correlating neural network may identify the next chronologically occurring test set as the test set of interest. For example, if the test set of interest most recently identified at block 710 includes triggered integration process execution logs and triggering event metadata from the first day of the month, the test set including triggered integration process execution logs and triggering event metadata from the second day of month may be identified at block 726 as the new test set of interest. The method may then proceed back to block 712 for training of the triggering event correlating neural network using the newly identified test set of interest. The loop between blocks 712 and 726 in an embodiment may constitute several training sessions of the triggering event correlating neural network based on all available test sets.

The intelligent real time listen and load balance system in an embodiment may identify a dataset changed pursuant to a triggering event, and a triggered integration process, both associated with the output layer neural nodes of the triggering event correlating neural network having a value below a preset threshold value, as strongly correlated to one another at block 728. This preset threshold may be set by the user or may be set automatically by the intelligent real time listen and load balance system in an embodiment. For example, changes made to a specific dataset during a triggering event may be considered strongly correlated to a triggered integration process if the output node comparing the dataset changed during the triggering event and the triggered integration process has a value of less than 1%, 5%, or 10%. The method may then end.

Figure 8:
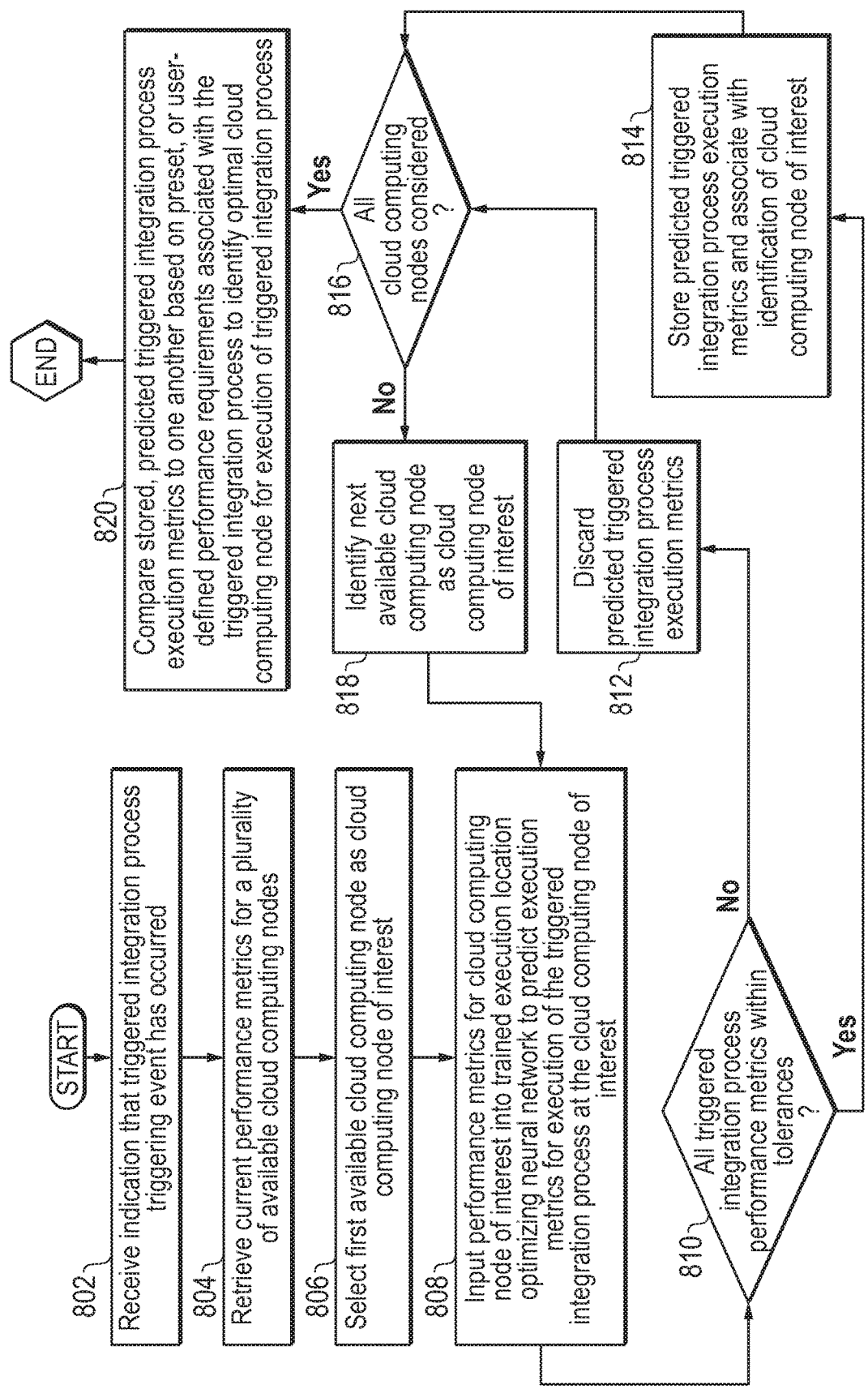
FIG. 8 is a flow diagram illustrating a method of determining an optimal cloud computing node for execution of a triggered integration process according to an embodiment of the present disclosure.

FIG. 8 is a flow diagram illustrating a method of determining an optimal cloud computing node for execution of a triggered integration process using an execution location optimizing neural network according to an embodiment of the present disclosure. In addition to optimizing scheduling of a triggered integration process' execution, embodiments of the present application may also optimize selection of the computing resource used to execute such triggered integration processes. Cloud computing services allow users to move computing activities away from on-site servers and infrastructure owned by the user to servers and infrastructure (e.g., a plurality of cloud computing nodes) located remotely from the user, but interconnected via the world wide web. Determining an optimal cloud computing node for execution of a given integration process may depend on many factors, including performance metrics for available cloud computing nodes, as well as certain characteristics of the specific integration process the user wishes to execute. An execution location optimizing neural network in an embodiment may determine an optimal cloud computing node for execution of a triggered integration process, at the time of a detected triggering event for that process. The execution location optimizing neural network may determine an optimal cloud computing node for execution of the triggered integration process based on inputs characterizing the triggered integration process and inputs characterizing performance metrics for a plurality of available cloud computing nodes.

At block 802 in an embodiment, the intelligent real time listen and load balance system may determine that a triggered integration process triggering event has occurred. For example, the user of the integration process modelling GUI in an embodiment may have modeled the start element of the triggered integration process to include a "listener" plug in API designed to detect when the triggering event reflects changes made to a specific dataset. In such an embodiment, upon receipt of metadata for the triggering event indicates changes were made to that specific dataset, the intelligent real time listen and load balance system may determine the triggering event for that triggered integration process has occurred.

In another embodiment, the triggering event for the triggered integration process may have been determined by identifying changes made to a specific dataset that are highly correlated with the triggered integration process, as described above with reference to FIG. 7. In such an embodiment, the intelligent real time listen and load balance system may automatically institute a "listener" that sets the triggered integration process to execute upon detected changes made to that specific dataset.

The intelligent real time listen and load balance system in an embodiment may retrieve current performance metrics for a plurality of available cloud computing nodes at block 804. The efficiency with which any given integration process may be executed in an embodiment may depend, at least in part, upon the traffic conditions currently experienced at the cloud computing node where the integration process is being executed. The intelligent real time listen and load balance system may gather real-time performance metrics describing such cloud computing node efficiency at the time of the triggered integration process triggering event. Such cloud computing node performance metrics may include, for example, bandwidth usage, throughput, latency, and dropped packets in an embodiment. Other embodiments may further include the retrieval of other cloud computing node performance metrics, such as, for example, retransmission of transmission control protocol (TCP) acknowledgement requests, network availability, and network connectivity. These factors may comprise performance metrics describing current operating conditions at an address-specified cloud computing node in an embodiment.

At block 806, the intelligent real time listen and load balance system in an embodiment may select the first available cloud computing node as the cloud computing node of interest. As described with reference to FIG. 6, a user of the integration process modeling GUI in an embodiment may have access to several different cloud computing nodes, including nodes 645, and 653. The intelligent real time listen and load balance system may consider each of these nodes serially for candidacy as the optimal cloud computing node to execute a given triggered integration process. For example, the intelligent real time listen and load balance system in an embodiment may identify node 645 as the cloud computing node of interest at block 806.

The intelligent real time listen load balance system at block 808 in an embodiment may input the performance metrics received at block 804 into the trained execution location optimizing neural network to predict execution metrics for execution of the triggered integration process at the cloud computing node of interest. For example, the intelligent real time listen and load balance system in an embodiment may input the cloud computing performance metrics for the cloud computing node of interest, including bandwidth usage, throughput, latency, and dropped packets. In another example embodiment, the intelligent real time listen and load balance system may input the cloud computing performance metrics including retransmission TCP acknowledgement requests, network availability, and network connectivity. These input values may be forward propagated through several layers of a trained neural network to output predicted execution metrics for the triggered integration process. These predicted execution metrics for the triggered integration process may be generated based on previously observed metrics for executions of the same triggered integration process at cloud computing nodes displaying various cloud computing node performance metrics. The predicted execution metrics may predict the efficiency and success of executing the triggered integration process at any given cloud computing node, based on the current performance metrics for that cloud computing node.

At block 810, the intelligent real time listen and load balance system in an embodiment may determine whether all triggered integration process performance metrics within the output layer of the execution location optimizing neural network fall within preset tolerances. The user in an embodiment may preset or predefine basic operational requirements for a given triggered integration process. In other embodiments, the intelligent real time listen and load balance system or the integration application management system may automatically assign default operational requirements. Such operational requirements in an embodiment may define, for example, the total time required to execute the triggered integration process, the failure rate for executions, or the number of time outs (e.g., failures to complete the process within a preset time period) and consequent restarts of the triggered integration process occur. In other embodiments, such operational requirements may define, for example, the number of datasets migrated over a preset period of time (e.g., datasets/second), the number of critical errors detected during migration, or the number of times a dataset must be retransmitted due to a critical error.

The output layer of the execution location optimizing neural network in an embodiment may provide a predicted value for each of these factors. For example, the output layer generated at block 808 in an embodiment may include a neural node having a value representing the predicted chance that the triggered integration process will fail to fully execute at the neural node of interest. As another example, the output layer may include a neural node having a value representing the predicted time to complete execution of the triggered integration process at the cloud computing node of interest. As yet another example, the output layer may include a neural node having a value representing the predicted critical errors that may occur.

If at least one of the neural nodes within the output layer of the execution location optimizing neural network does not fall within preset tolerances, the neural node of interest may not be capable of executing the triggered integration process within preset triggered integration process performance requirements, and the method may proceed to block 812 where the predicted triggered integration process execution metrics within the output layer may be discarded. If each of the neural nodes within the output layer of the execution location optimizing neural network fall within preset tolerances, the neural node of interest may be capable of executing the triggered integration process within preset triggered integration process performance requirements, and the method may proceed to block 814 for storage of the predicted triggered integration process execution metrics given in the output layer.

The intelligent real time listen and load balance system at block 812 in an embodiment may discard the predicted triggered integration process execution metrics generated in the output layer of the execution location optimizing neural network at block 808 for the cloud computing node of interest. This may occur in an embodiment in which the predicted triggered integration process execution metrics for the cloud computing node of interest fail to meet preset triggered integration process performance requirements. The method may then proceed to block 816 to determine whether all available cloud computing nodes have been analyzed using the execution location optimizing neural network.

At block 814, the intelligent real time listen and load balance system may store the predicted triggered integration process execution metrics generated in the output layer of the execution location optimizing neural network at block 808 for the cloud computing node of interest. The intelligent real time listen and load balance system in such an embodiment may also associate the stored, predicted triggered integration process execution metrics with an identification of the cloud computing node of interest. This may occur in an embodiment in which the predicted triggered integration process execution metrics for the cloud computing node of interest meet preset triggered integration process performance requirements. The cloud computing node of interest may then be later considered as a candidate for the optimal cloud computing node.

The intelligent real time listen and load balance system may determine at block 816 whether predicted triggered integration process execution metrics have been generated or analyzed for each of the available cloud computing nodes. If each of the cloud computing nodes have not yet been considered, the method may proceed to block 818 for identification of a next available cloud computing node as a cloud computing node of interest. If each of the cloud computing nodes have been considered, predicted triggered integration process execution metrics for each of the available cloud computing nodes may have been generated, and the method may proceed to block 820 for selection of a most optimal cloud computing node for execution of the triggered integration process.

At block 818, the intelligent real time listen and load balance system in an embodiment in which all cloud computing nodes have not yet been analyzed may identify the next available cloud computing node as the cloud computing node of interest. For example, in an embodiment in which node 645 was designated as the node of interest at block 806, the intelligent real time listen and load balance system may identify node 653 as the node of interest at block 816. The method may then proceed back to block 808 for determination of predicted triggered integration process execution metrics for the newly identified cloud computing node of interest. By looping between blocks 808 and 818, the execution location optimizing neural network in an embodiment may predict the performance for a given triggered integration process at a plurality of cloud computing nodes, based on current or near-current performance metrics at each of those nodes.

The intelligent real time listen and load balance system in an embodiment in which the execution location optimizing neural network has predicted the performance for a given triggered integration process at a plurality of cloud computing nodes may compare each of these predicted metrics to identify an optimal cloud computing node at block 820. More specifically, the intelligent real time listen and load balance system in such an embodiment may compare the stored, predicted triggered integration process execution metrics to one another based on preset, or user-defined performance requirements associated with the triggered integration process to identify an optimal cloud computing node for execution of that specific triggered integration process.

Such a comparison may involve identifying the cloud computing node associated with a best value for a specific predicted execution metric, specifically preset for an individual triggered integration process. For example, a user or the intelligent real time listen and load balance system may determine a most important predicted execution metric for a given triggered integration process. More specifically, a user may identify estimated time for completion of the integration process as the most important execution metric for a triggered integration process operating to update inventories based on online purchases. In another example, the intelligent real time listen and load balance system may identify an estimated number of critical errors that will occur as the most important execution metric for a triggered integration process for updating billing information, as this may cause inconsistencies between customer accounts. In another aspect, the importance of each of the predicted execution metrics may be ranked hierarchically, or may be weighted. The method may then end. In such a way, the intelligent real time listen and load balance system may make a real time assessment of the best location at which to execute the triggered integration process, just prior to its execution.

Figure 9:
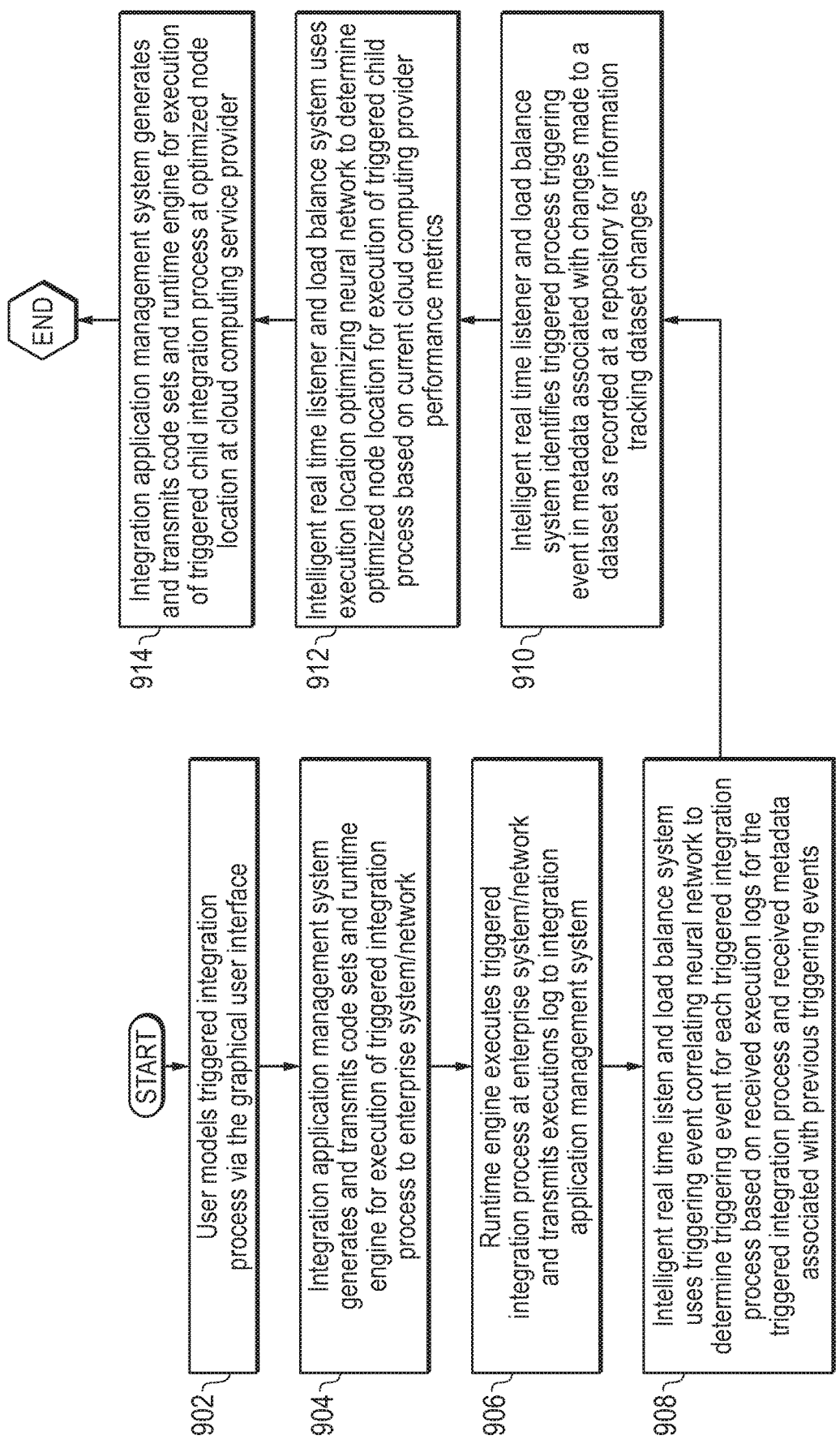
FIG. 9 is a flow diagram illustrating a method of executing an integration process at an optimized cloud computing location according to an embodiment of the present disclosure.

FIG. 9 is a flow diagram illustrating a method of executing a triggered integration process at an optimized cloud computing location upon determination that an optimized triggering event has occurred according to an embodiment of the present disclosure. As described herein, the intelligent real time listen and load balance system in an embodiment may provide real-time optimization for executing triggered integration processes. Previous systems allow for user-specified triggering events for triggered integration processes that underutilize the ability to optimize these triggering events based on all available metadata associated with the triggering event and the triggered integration processes. In a similar vein, these previous systems allow for some load-balancing based on static characteristics of the triggered integration process or available cloud computing nodes, but fail to consider current or real-time performance metrics for each of these cloud computing nodes, and the effects these metrics may have on execution of the triggered integration process at a given time or via a given node location. Thus, the previous systems failed to provide tailored optimizations based on real-time analysis of performance requirements for a specific triggered integration process and performance metrics for available cloud computing nodes. The method of FIG. 9 overcomes these difficulties. It is contemplated that portions of the method of FIG. 9 may be used to optimize an intelligent listener API plug in to real time modify time of execution of a triggered integration process without implementing node execution location optimization or vice-versa. Those of ordinary skill in the art will appreciate that FIG. 9 describes implementing both aspects, but may be implemented with either aspect individually in some embodiments.

At block 902 in an embodiment, a user may model a triggered integration process via the graphical user interface. A user operating within an enterprise system/network in an embodiment may transmit user instructions, modeling a triggered integration process, via an integration process flow modeling GUI. As described herein, a user of the integration process flow modeling GUI in an embodiment may model multiple business integration processes, including triggered integration processes that are preset to execute upon the occurrence of specified triggering events. The execution of such a specified triggering event may trigger execution of a triggered integration process modeled in an embodiment described with reference to FIG. 4, for example.

The integration application management system in an embodiment may generate and transmit code sets and a runtime engine for execution of the triggered integration process to an enterprise system/network at block 904. A code set compiling engine of the integration application management system in an embodiment may receive the user-specified triggered integration process flow model in an embodiment from the integration process flow modeling graphical user interface. The integration application management system code set compiling engine in an embodiment may operate to generate the code instructions for user-modeled integration processes customized for a particular user's needs. The code set compiling engine in an embodiment may accomplish this by retrieving non-customized code sets from a connector code sets repository, then customizing these code sets based on the received triggered integration process flow model. Connector code sets, and trading partner code sets may be stored in part in the disk drive unit, static memory, or computer readable medium of a portion of the intelligent real time listen and load balance system, or the integration application management system in an embodiment on an enterprise system or service provider system for executing the triggered integration process. In other aspects of an embodiment, data profile code sets, and run-time engines may also be stored in part or in full in the disk drive unit, static memory, or computer readable medium of the intelligent real time listen and load balance system, or the integration application management system.

Once the code sets are customized based on the triggered integration process flow model generated by the user in an embodiment, the code set compiling engine may transmit these code instructions, along with a runtime engine for remote execution of those code instructions at the enterprise system/network. In other embodiments (not shown), these code instructions and runtime engine may be transmitted to a cloud computing service provider for execution at one or more cloud computing nodes. In such a way, users may customize triggered integration processes using these visual elements, without having to learn the underlying computer language that will execute these steps. These transmitted code instructions may include transmission of the trained, intelligent listener API in some aspects as part of the runtime engine from the intelligent real time listen and load balance system.

At block 906, the runtime engine may execute a triggered integration process at an enterprise system/network and transmit execution logs to the integration application management system. Upon execution of the triggered integration process at the enterprise system/network in an embodiment, the runtime engine executing at the enterprise system/network may transmit an execution log to the integration application management system. In other embodiments in which the triggered integration process was executed at a cloud computing node, the runtime engine executing at the cloud computing node may transmit such an execution log to the integration application management system. The execution logs transmitted to the integration application management system in such a way may be stored at an executed process metadata storage device managed by the integration application management system service provider server/system or locally for use with a trained intelligent listener API. The execution logs in an embodiment may describe integration process execution metrics for previously executed triggered integration processes executing in response to occurrence of triggering events. The execution logs may record dataset maintenance events that occur during execution of triggered integration processes developed pursuant to GUI modelled integration processes developed under an integration application management system. Such integration process execution metrics may include, for example, the number of datasets transacted during the execution (e.g., as described with reference to FIG. 5), the number of each type of visual element included in the modeling of such an integration process, and the time to completion of each integration process, among other details.

A portion of the intelligent real time listen and load balance system distributed as one or more intelligent listener API plug-ins at triggered integration processes in an embodiment may use a triggering event correlating neural network to determine an optimal triggering event for each triggered integration process based on received execution logs at block 908. For example, in an embodiment described with respect to FIG. 7, the triggering event correlating neural network may have been trained according to FIG. 7 to determine a triggering event including receipt of customer payment information during an online purchase is highly correlated with a triggered integration process for updating customer payment information. As another example, the trained triggering event correlating neural network of an intelligent listener API in a triggered integration process may determine a triggering event including receipt of an item or service category used for targeted ads is highly correlated with the triggered integration process for storing an association between the customer and the item or service category. In yet another example, a triggering event including the receipt of a number of items purchased may be highly correlated to a triggered integration process for updating inventory values. In each of these example embodiments, the receipt or changes to the dataset that is highly correlated to the triggered integration process may be identified as a triggering event for the triggered integration process and cause the trained intelligent listener API to execute the triggered integration process.

As described herein, the intelligent real time listen and load balance system in an embodiment may automatically set the triggered integration process to execute, via the trained intelligent listener API, upon detection that a triggering event for that process has occurred. For example, as described with reference to FIG. 4, an intelligent listener API may be applied to the start element 402, directing the triggered integration process modeled by GUI 400 to execute when occurrence of the triggering event is detected. In other embodiments, a listener may be applied directly by the user, and may not involve determination of an optimal triggering event via the triggering event correlating neural network of an intelligent listener API as determined via training according to embodiments such as those of FIG. 7 when only node location optimization of FIG. 9 is implemented in some embodiments.

The intelligent real time listener and load balance system in an embodiment may detect occurrence of a triggering event by polling a repository of information tracking dataset changes at block 910. For example, the repository of information tracking dataset changes may indicate changes have been made to a dataset specifically identified within a listener for the triggered integration process, such as a dataset including customer payment information during an online purchase. This listener in such an embodiment may determine this triggering event (e.g., receipt of the dataset customer payment information) has occurred, and consequently trigger execution of a triggered integration process for updating customer payment information. As another example, metadata for a triggering event may indicate receipt of a dataset describing an item or service category used for targeted ads, triggering a triggered integration process for storing an association between the customer and the item or service category. In yet another example, metadata for a triggering event may indicate receipt of a dataset describing a number of items purchased, triggering execution of a triggered integration process for updating inventory values.

At block 912, the intelligent real time listener and load balance system may use a trained execution location optimizing neural network of an intelligent listener API to determine an optimized node location for execution of triggered integration processes based on current cloud computing provider performance metrics. For example, in an embodiment described with reference to FIG. 8, the intelligent real time listener and load balance system may be trained to determine a cloud computing node having a shortest estimated time to complete execution of a triggered integration process for updating inventory is the optimal cloud computing node for execution of that triggered integration process. In another example, the intelligent real time listener and load balance system may be trained to determine a cloud computing node having a lowest estimated number of critical errors may be the optimal cloud computing node for execution of a triggered integration process for updating customer payment information. In other embodiments, the user may preset the cloud computing node, or other location (e.g., user enterprise system/network) where the triggered integration application should be executed. Such embodiments may not require the determination of an optimal cloud computing node using the trained execution location optimizing neural network of the intelligent listener API.

The integration application management system in an embodiment may generate and transmit code sets and a runtime engine including a trained, intelligent listener API for execution of the triggered integration process at an optimized cloud computing node location at block 914. Upon determining an execution of a triggered integration process has been triggered and determination of where such a triggered integration process should be executed (e.g., an optimal cloud computing node, or a location specified by the user), the integration application management system may generate code sets for executing the triggered integration process modeled by the user (e.g., in FIG. 4), as well as a runtime engine for automatically performing such an execution. The integration application management system may then transmit the code sets and runtime engine for the triggered integration process for automatic or immediate execution at the determined execution location. In such a way, the triggered integration process may be executed at a cloud computing node determined to be optimal for that specific triggered integration process, based on real time performance metrics of that cloud computing node measured at the time the triggered integration process is triggered.

The blocks of the flow diagrams 7-9 discussed above need not be performed in any given or specified order and may be executed as code instructions at one or a plurality of processors during preparation and set up of a modeled integration process or of a deployed integration process as described herein. It is contemplated that additional blocks, steps, or functions may be added, some blocks, steps or functions may not be performed, blocks, steps, or functions may occur contemporaneously, and blocks, steps or functions from one flow diagram may be performed within another flow diagram. Further, those of skill will understand that additional blocks or steps, or alternative blocks or steps may occur within the flow diagrams discussed for the algorithms above.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system operating an intelligent real time listen and load balance system comprising:
    a processor receiving a customized data business integration process modeled via a graphical user interface with icons and connectors for executing one or more triggered business integration processes in response to triggering events;
    the processor training a triggering event correlating neural network for an intelligent listener API to poll a repository of information tracking changes made to datasets to identify a correlation between previous changes made to a dataset during previous triggering events for a triggered integration process and previous executions of the triggered integration process, based on previous co-occurrences of the previous triggering events and the previous executions of the triggered integration process;

the processor determining, based on updated received metadata associated with a current triggering event input into a trained triggering event correlating neural network, that current changes to the dataset during the current triggering event correlates to the triggered integration process, indicating new or modified data requires execution of the triggered integration process;

the processor determining predicted triggered integration process execution metrics for a plurality of cloud computing nodes by inputting received performance metrics for a plurality of cloud computing nodes into training an execution location optimizing neural network for the triggered integration process;

the processor identifying an optimal one of the plurality of cloud computing nodes by comparing the predicted triggered integration process execution metrics for the plurality of cloud computing nodes, based on preset performance requirements; and a network interface device transmitting code sets and a runtime engine for automatic execution of the triggered integration process to the optimal cloud computing node.

2. The information handling system of claim 1, wherein performance metrics describing current operating conditions for the plurality of cloud computing nodes include a measurement of dropped packets during a preset period of time during execution of the triggered integration process.

3. The information handling system of claim 1, wherein predicted triggered integration process execution metrics include failure to complete execution of the triggered integration process.

4. The information handling system of claim 1, wherein predicted triggered integration process execution metrics include time outs occurring prior to completion of execution of the triggered integration process.

5. The information handling system of claim 1, wherein predicted triggered integration process execution metrics include time to complete execution of the triggered integration process.

6. The information handling system of claim 1, wherein the predicted triggered integration process execution metrics includes a predicted total time required to complete execution of the triggered integration process.

7. The information handling system of claim 1 further comprising:
a graphical user interface displaying dependence of the triggered integration process upon the current changes made to the dataset during the triggering event through customization of a start visual element representing a portion of the triggered integration process.

8. A method of intelligent, real time load balancing for execution of an integration process comprising:
executing, via processor, a customized data business integration process modeled via a graphical user interface with icons and connectors and including code instructions for executing one or more triggered business integration processes in response to triggering events;
determining, via a processor, by polling a repository of information tracking changes made to datasets that a triggering event for the triggered integration process has occurred based on metadata associated with the triggering event and upon execution logs for previous executions of the triggered integration process;
receiving, via a network interface device, performance metrics describing current operating conditions for a plurality of cloud computing nodes;
determining predicted triggered integration process execution metrics for each of the plurality of cloud computing nodes, describing predicted performance of the triggered integration process at each of the plurality of cloud computing nodes, by inputting the performance metrics for the plurality of cloud computing nodes into an execution location optimizing neural network trained for the triggered integration process;
identifying an optimal cloud computing node by comparing the predicted triggered integration process execution metrics for each of the plurality of cloud computing nodes, based on preset triggered integration process performance requirements; and
transmitting code sets and a runtime engine for automatic execution of the triggered integration process to the optimal cloud computing node.

9. The method of claim 8, wherein the triggering event is predefined by a user via an integration process modelling graphical user interface for a start shape visual element of the triggered integration process.

10. The method of claim 8, wherein the triggering event is determined by the processor via a triggering event correlating neural network of an intelligent listener API, based on previous co-occurrences of previous changes made to a dataset during previous triggering events and previous executions of a triggered integration process modeled in part using a start shape visual element identifying the triggering event.

11. The method of claim 8, wherein performance metrics describing current operating conditions for the plurality of cloud computing nodes include a latency measurement.

12. The method of claim 8, wherein performance metrics describing current operating conditions for the plurality of cloud computing nodes include a throughput measurement.

13. The method of claim 8, wherein the predicted triggered integration process execution metrics includes a predicted number of datasets created, read, updated, or deleted over a preset period of time.

14. The method of claim 8, wherein the predicted triggered integration process execution metrics includes a predicted total time required to complete execution of the triggered integration process.

15. An information handling system operating an intelligent real time listen and load balance system comprising:
a processor receiving a customized data business integration process modeled via a graphical user interface with icons and connectors for executing one or more triggered business integration processes in response to triggering events;
a network interface device receiving a plurality of metadata files describing changes made to a plurality of datasets during a plurality of previous triggering events, and a plurality of execution logs describing previous executions of a triggered integration process modeled using a plurality of visual elements including a start visual element identifying one or more of the plurality of previous triggering events as events triggering execution of the triggered integration process;
a processor training a triggering event correlating neural network to poll a repository of information tracking changes made to datasets and to identify a correlation between a first change made to a first dataset described in one or more of the plurality of metadata files for the previous triggering events and a second change made to a second dataset described in at least one of the plurality of execution logs for previous executions of the triggered integration process, based on previous co-occurrences of the first change made to the first dataset and the second change made to the second dataset;

the processor executing code instructions of the intelligent real time listen and load balance system to set a trained, intelligent listener API to execute the triggered integration process upon determining the first change has been made to the first dataset pursuant to a current triggering event; and the network interface device transmitting code sets and a runtime engine for execution of the triggered integration process to an execution location.

16. The information handling system of claim 15, wherein the previous triggering event co-occurs with the previous execution of the triggered integration process when the previous execution of the triggered integration process is prompted by occurrence of the previous triggering event.

17. The information handling system of claim 15, wherein the plurality of previous executions of the triggered integration process were set by the user to occur each time the previous triggered events occurred.

18. The information handling system of claim 15, wherein the remote location is preset by a user via an integration process modelling graphical user interface.

19. The information handling system of claim 15 further comprising:

the processor determining an optimal one of a plurality of cloud computing nodes via an execution location optimizing neural network based on predicted triggered integration process execution metrics, for each of a plurality of cloud computing nodes as the execution location of the triggered integration process.

20. The information handling system of claim 15 further comprising:

the processor training the triggering event correlating neural network to identify a plurality of correlations between the triggered integration process and a plurality of datasets changed during a plurality of previous triggering events; and identifying one of the plurality of datasets changed during the plurality of previous triggering events most closely correlated to the triggered integration process according to the triggering event correlating neural network as the dataset of the previous triggering events correlated to the triggered integration process.

* * * * *